United States Patent
Diamond et al.

(10) Patent No.: US 12,547,699 B2
(45) Date of Patent: Feb. 10, 2026

(54) SYSTEM AND METHOD FOR SECURELY RETRIEVING FROM A SECRETS MANAGER SECURITY CREDENTIALS FOR MIGRATION OF PASSWORD PROTECTED DATA FROM A PASSWORD PROTECTED DATA REPOSITORY

(71) Applicant: BOOMI, LP, Chesterbrook, PA (US)

(72) Inventors: Eric G. Diamond, Downingtown, PA (US); Dana S. Burkart, San Jose, CA (US); Aleksandr Morozyuk, East Norriton, PA (US)

(73) Assignee: BOOMI, LP, Chesterbrook, PA (US)

( * ) Notice: Subject to any disclaimer, the term of this patent is extended or adjusted under 35 U.S.C. 154(b) by 167 days.

(21) Appl. No.: 18/593,822

(22) Filed: Mar. 1, 2024

(65) Prior Publication Data

US 2025/0278472 A1 Sep. 4, 2025

(51) Int. Cl.
*G06F 21/45* (2013.01)
*H04L 9/06* (2006.01)
*H04L 9/32* (2006.01)

(52) U.S. Cl.
CPC .......... *G06F 21/45* (2013.01); *H04L 9/0618* (2013.01); *H04L 9/3226* (2013.01)

(58) Field of Classification Search
CPC ...... G06F 21/45; H04L 9/0618; H04L 9/3226
See application file for complete search history.

(56) References Cited

U.S. PATENT DOCUMENTS

| | | | | |
|---|---|---|---|---|
| 7,617,261 B2* | 11/2009 | Telkowski | ......... | G06F 11/0727 |
| 9,319,286 B2* | 4/2016 | Panuganty | ............. | H04L 63/20 |
| 9,697,371 B1* | 7/2017 | Willden | ................. | G06F 21/62 |
| 10,318,412 B1* | 6/2019 | McKearney, Jr. | ........ | G06F 8/10 |
| 11,681,608 B2* | 6/2023 | Sharma | ............... | G06F 11/3692 |
| | | | | 717/124 |
| 11,693,624 B2* | 7/2023 | Mou | ....................... | G06F 18/15 |
| | | | | 706/12 |

(Continued)

FOREIGN PATENT DOCUMENTS

WO 2018/176356 A1 10/2018

*Primary Examiner* — J. Brant Murphy
(74) *Attorney, Agent, or Firm* — Prol Intellectual Property Law, PLLC; H. Kenneth Prol

(57) ABSTRACT

An information handling system operating a security credential retrieval system may comprise a processor executing code instructions for a graphical user interface (GUI) to model, with visual integration elements, a flow diagram of a password protected data integration process for transmitting a keychain password to the security credential management system to retrieve security credentials for password protected data repositories, for supplying the security credentials to the password protected data repositories, and for migrating password protected data sets from the password protected data repositories to destination data repositories. The processor may execute connector code instructions for each of the visual integration elements, including data required for electronic communication in accordance with the security credential management system, the password protected data repositories, and the password protected data repositories, and to display any security credentials in the execution log recording the execution of the connector code instructions in encrypted ciphertext.

20 Claims, 7 Drawing Sheets

(56) References Cited

U.S. PATENT DOCUMENTS

| | | | |
|---|---|---|---|
| 11,743,330 B1* | 8/2023 | Gilbert | G06F 21/32 709/203 |
| 2016/0142399 A1* | 5/2016 | Pace | G06F 21/41 726/4 |
| 2018/0167490 A1* | 6/2018 | Morton | G06F 3/167 |
| 2019/0272387 A1* | 9/2019 | Gkoulalas-Divanis | G06F 21/604 |
| 2020/0125582 A1* | 4/2020 | O'Shaughnessy | G06F 16/245 |
| 2020/0280855 A1* | 9/2020 | Avetisov | H04L 63/20 |
| 2022/0138345 A1* | 5/2022 | Krishnan | G06N 3/0499 726/26 |
| 2022/0283933 A1* | 9/2022 | Sharma | G06F 11/3684 |
| 2023/0262072 A1* | 8/2023 | Cambric | G06N 3/08 726/22 |
| 2024/0019086 A1* | 1/2024 | Pirsiavash | F17D 5/00 |
| 2025/0103040 A1* | 3/2025 | Arukhe | G05B 23/0283 |
| 2025/0247247 A1* | 7/2025 | Falko | G06F 21/44 |

* cited by examiner

SYSTEM AND METHOD FOR SECURELY RETRIEVING FROM A SECRETS MANAGER SECURITY CREDENTIALS FOR MIGRATION OF PASSWORD PROTECTED DATA FROM A PASSWORD PROTECTED DATA REPOSITORY

FIELD OF THE DISCLOSURE

The present disclosure relates generally to a system and method for modeling, connecting to or executing customized data integration processes. More specifically, the present disclosure relates to securely retrieving one or more passwords for accessing remote password protected data repositories from a security credential management system or secrets manager platform as part of or in tandem with a password protected data integration process. The password protected data integration process requires utilize secrets or passwords for accessing password protected data and migrating such password protected data from one or more remote password protected data repositories to a destination data repository.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
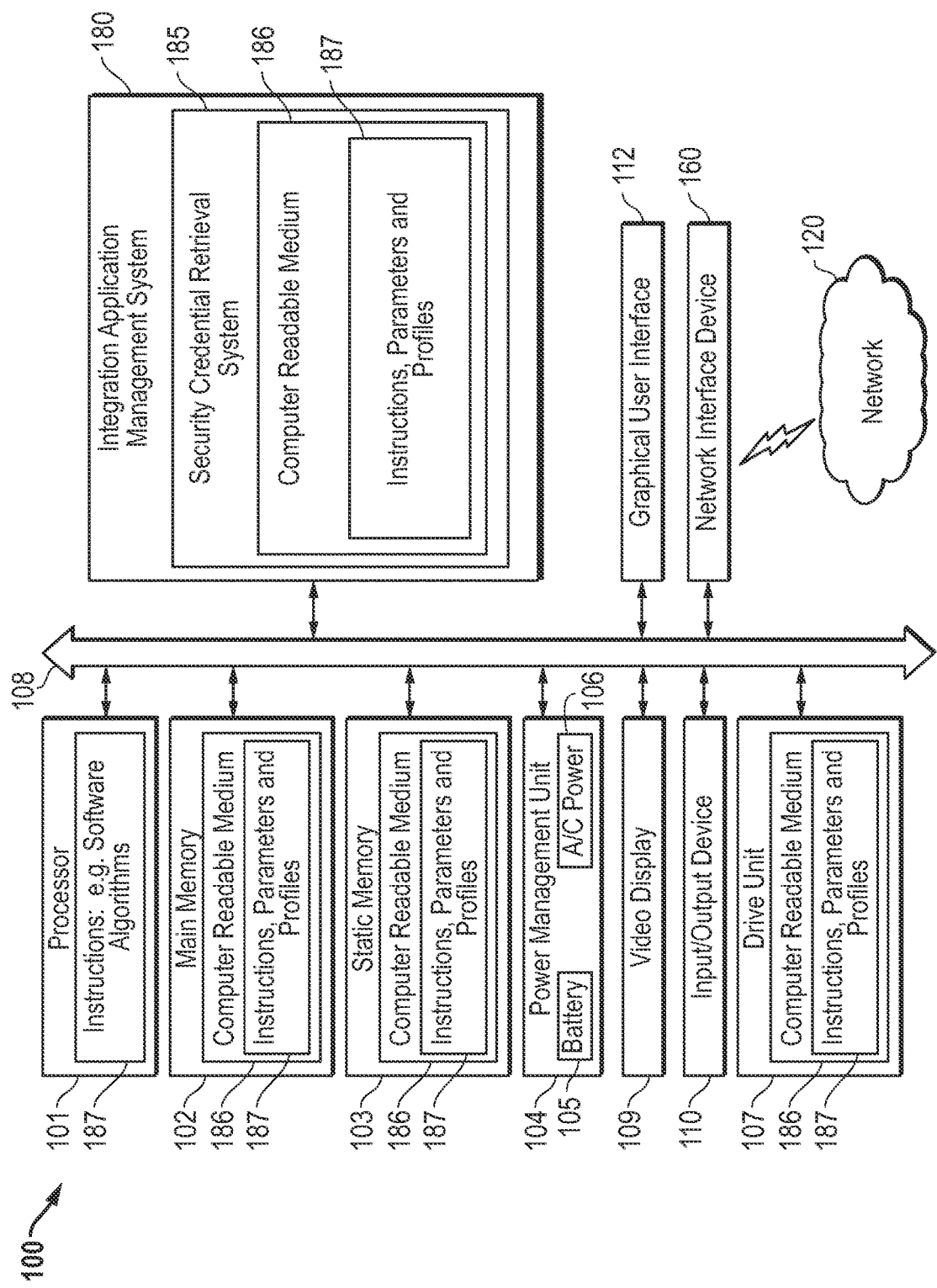
FIG. 1 is a block diagram illustrating an information handling system with a visual integration modeling system and security credential retrieval system for generation or execution of data integration processes according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, or distribution via download of the application from the worldwide web to an end user. Upon receipt of the downloaded application, the end user executes installation files to install the executable software application on the user's personal computer (PC), or other information handling system. When the software is initially executed, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments. Custom coding may be required to provide integration among disparate databases which may be costly and time consuming.

Today, most corporations or other enterprises have sophisticated computing systems that are used both for internal operations, and for communicating outside the enterprise's network. Much of present day information exchange is conducted electronically, via communications networks, both internally to the enterprise, and among enterprises having disparate database systems and access policies. Accordingly, it is often desirable or necessary to exchange information/data between distinctly different computing systems, computer networks, software applications, and the like that operate in distinct data formats that may have varying levels of compatibility. The enabling of communications between diverse systems/networks/applications in connection with the conducting of business processes is often referred to as "business process data integration." In the business process data integration context, there is a significant need to communicate between different software applications/systems utilizing distinct data formats within a single computing network, such as, between an enterprise's information warehouse management system and the same enterprise's purchase order processing system. There is also a significant need to communicate between different software applications/systems within different computing networks (e.g., between a buyer's purchase order processing system, and a seller's invoicing system) utilizing distinct data formats, sometimes referred to as a business to business (B2B) process. Some of these different software applications/systems may be cloud-based, with physical servers located in several different countries, cities, or other geographical locations around the world. As data is integrated between and among these cloud-based platforms, datasets may be stored (e.g., temporarily or indefinitely) in some form at physical servers in these various storage locations according to the required formatting for that storage location.

Relatively recently, systems have been established to enable exchange of data via the Internet, e.g., via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as Electronic Data Interchange (EDI) Software, or Business-to-Business (B2B) Integration Software to connect to the seller's computing system and to deliver electronically a business "document," such as a purchase order, without requiring human intervention to manually enter or transform the data. Such software applications are available in the market today. These applications are typically purchased from software vendors and installed on a computerized system owned and maintained by the business, in this example, the buyer. The seller will have a similar/complimentary software application on its system, so that the information exchange may be completely automated in both directions. In contrast to the present disclosure, these applications are purchased, installed and operated on the user's local system and require expensive customization. Thus, the user typically owns and maintains its own copy of the system, and configures the application locally to connect with its trading partners.

In both the traditional and more recent approaches, the executable software application is universal or "generic" as to all trading partner definitions (e.g., participants within a B2B process) before it is received and installed within a specific enterprise's computing network. In other words, it is delivered to different users/systems in identical, generic form. The software application is then installed within a specific enterprise's computing network (which may include data centers, etc., physically located outside of an enterprises' physical boundaries). After the generic application is installed, it is then configured and customized for a specific trading partner at some expense and time after which it is ready for execution to exchange data between the specific trading partner and the enterprise. For example, Amazon® may provide on its website specifications of how electronic data such as Purchase Orders and Invoices must be formatted for electronic data communication with Amazon, and how that data should be communicated with Amazon®. A supplier/enterprise is then responsible for finding a generic, commercially available software product that will comply with these communication requirements and then for configuring it appropriately. Accordingly, the software application will not be customized for any specific supplier until after that supplier downloads the software application to its computing network and configures the software application for the specific supplier's computing network, etc. The supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are visually modeled using a visual integration modeling system to customize a business integration for a specific enterprise before they arrive within the enterprise's computing network, and are delivered to the destination network in customized form. The Boomi® Application is an example of one such software application involving a visual integration modeling system. With Boomi® and other similar applications, an employee within an enterprise can connect to a website using a specially configured integration process code instructions flow modeling user interface of the visual integration modeling system to visually model business integration process code instructions via icons and a flow-charting process. This may be done via a local GUI or one provided via a web browser interface. During such a visual modeling process, the user would select from a predetermined set of process-representing visual elements or icons that are stored on a remote server in a library, such as the web server. By way of an example, the integration process code instructions could enable a bi-directional exchange of data between internal applications of an enterprise, between internal enterprise applications and external trading partners, or between internal enterprise applications and applications running external to the enterprise having distinct formats that may be wholly or partially incompatible.

A customized data integration software application creation system having this visual integration modeling system in an embodiment may allow a user to create a customized data integration software application by modeling data integration process code instructions flow using the graphical user interface as described. A visually modeled data integration process flow in embodiments of the present disclosure may visually model actions taken on data elements represented by visual icons pursuant to executable code instructions associated with the same, without displaying the code instructions themselves. In such a way, the graphical user interface may allow a user to understand the high-level summary via the visual modeling of what executable code instructions achieve, without having to read or understand the code instructions themselves. Similarly, by allowing a user to insert visual elements or visual icons representing portions of the data integration process code instructions into the visually modeled data integration process code instructions flow displayed on the graphical user interface, embodiments of the present disclosure allow a user to identify what she wants executable code instructions to achieve without having to write such executable code instructions. This can save expense and time of custom coding from programmers and make available an ecosystem library of visual elements usable and reusable in visual modeling of business process data integration.

Once a user has chosen what she wants an executable code instruction to achieve in embodiments herein, the code instructions capable of achieving such a task may be generated from the visual model of the visual integration modeling system. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, data structure formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the business integration process in some embodiments herein may be written in accordance with the same open-standard formats or other known, or later-developed standard formats.

In some cases, data sets or data elements migrated from one data repository to another using integration processes modeled with visual elements as described above may be password protected and such integration processes may require providing such passwords or security credentials to the data repository from which the password protected data sets may be migrated. For example, an integration process modeled via visual elements within the Boomi® GUI may involve supplying a password or security credentials to a secure data repository (e.g., SalesForce® platform or other client relationship management (CRM) platforms, or Oracle's® Netsuite Enterprise Resource Planning (ERP) Platform) in order to access password protected data sets that may contain sensitive client, employee, or business information (e.g., client contact information, invoice or billing information). This may be an early step within a larger integration process for migrating one or more of such password protected data sets from the password protected or secure data repository to a remote destination data repository (e.g., Infor's® Warehouse Management Software (WMS) Application). This remote destination data repository may be managed by the same enterprise user that provided the security credentials to access the password protected data repository, or may belong to a third party (e.g., when migrating purchase order information to a third party ordering platform, such as Amazon®). Similarly, any one of these data repositories may be managed on-site by an enterprise user or may be managed remotely as a cloud-based platform.

Enterprise users routinely store sensitive information within a plurality of such cloud-based platforms, each often requiring separate passwords, or recommending use of different passwords. In order to keep track of the growing volume of passwords required by enterprise users, many have begun using secrets managers or security credential management systems such as HashiCorp® Vault, LastPass®, or 1Password®. Such security credential management systems allow enterprise users to supply a single keychain password, authentication token, or machine-linked application role, authentication token, or machine-linked application role usually known to only select enterprise employees, such as an Information Security (InfoSec) team member, an individual contributor (IC) level member of technical staff that manages visual data integration processes, or other operations staff to access all of the passwords or security credentials necessary to access the enterprise's many password protected data repositories (e.g., SalesForce®, Netsuite®, etc.). In order to perform an integration process modeled using the visual elements within the Boomi® platform, these security credentials for any involved password protected data repositories must either be supplied by the Boomi® user, or must be retrieved from the security credentials manager, requiring the Boomi® user to supply the single keychain password, authentication token, or machine-linked application role, authentication token, or machine-linked application role for accessing the security credentials manager. In the case where the Boomi® user supplies the security credentials directly to the Boomi® platform, those credentials may be stored at the Boomi® platform. In embodiments of the present disclosure that instead involve transfer of the security credential from the security credentials manager to the password protected data repository, neither of which are operated by Boomi®, these credentials may not be stored at the Boomi® platform outside of a temporary cache. This may thus avoid unnecessary storage of the security credential at a third party location (e.g., the Boomi® platform) which may inherently increase security risks for security credentials.

In existing systems, the user supplies such security credentials or keychain passwords during each execution of the integration process for migrating the password protected data sets. If a password is later changed, this requires re-entry of the password prior to the next execution, which may occur several times a day, for example in some cases. In addition, execution of these integration processes results in generation of an execution log that lists each of the data sets so migrated, and may include the security credentials or keychain passwords provided by the user. Such execution logs may be generated automatically in embodiments herein in order to demonstrate compliance with customer instructions, government data privacy regulations, or for tracking errors made during data integration process execution.

These execution logs may list each of the datasets migrated during execution of a given integration process. For example, in an integration process that involves transmission of a keychain password and receipt of a security credential at an enterprise user, an execution log showing the keychain password and the retrieved security credential may be automatically generated. Although existing systems routinely do not show security credentials entered for use in password protected data integration processes, the execution logs after execution may risk display of such security credentials. Further, there is some chance that these logs may be viewed by entities outside the enterprise, such as by consultants, auditors, an enterprise user's customers or by a government entity, such as may occur during government privacy audits, for example. Such an automatically generated execution log showing the single keychain password, authentication token, or machine-linked application role or other security credentials, such as authentication token, or machine-linked application role known only to select enterprise employees, such as an Information Security (InfoSec) team member, an individual contributor (IC) level member of technical staff that manages visual data integration processes, or other operations staff could potentially be accessible by all Boomi® enterprise users and staff, for example, including enterprise users (e.g., enterprise IT professional) or auditors or others reviewing execution logs such as to track compliance in protection of personal information or others that otherwise would not have access to such information. A solution is needed that allows a user in possession of such a single keychain password, authentication token, or machine-linked application role, authentication token, or machine-linked application role to provide all security credentials necessary to complete a password protected data migration process at the time of modeling the visual elements that does not require updating each time the password changes, and that masks or obscures any keychain passwords used in such an execution within automatically generated execution logs.

The security credential retrieval system in embodiments of the present disclosure addresses these issues by allowing a user of the Boomi® GUI to model a password retrieval integration process either as an individual flow chart, or within the flow chart for a password protected data integration process that uses such retrieved passwords or security credentials. The Boomi® user may provide the single keychain password, authentication token, or machine-linked application role required to access the security credentials manager, as well as an identification of which security credentials to retrieve within such a flow of visual elements representing steps of retrieving security credentials needed to access the password protected data sets to be migrated as part of the password protected data integration process. The code instructions for the password protected data integration process modeled using these visual elements may then execute to access the security credentials management system, retrieve any security credentials for involved password protected data repositories, and perform the modeled migration of password protected data sets from these password protected data repositories to the destination data repository. In such a way, the Boomi® user may provide a single keychain password, authentication token, or machine-linked application role during the visual element modeling process that does not require updating each time the security credential accessed using this single keychain password, authentication token, or machine-linked application role changes at the security credential management system. The user may also revoke any access to the security credential management system at any time by deleting the single keychain password, authentication token, or machine-linked application role from any Boomi® modeled integration processes. Using the GUI, the user may also model additional steps of changing the data set field name or value for the supplied single keychain password, authentication token, or machine-linked application role or retrieved security credentials to appear within any later automatically generated execution log as encrypted ciphertext. This may ensure that the execution logs, which may be viewed in some cases by entities outside of the enterprise, or by enterprise users that otherwise would not have access to the single keychain password, authentication token, or machine-linked application role or the retrieved security credentials may not disclose the single keychain password, authentication token, or machine-linked application role or any retrieved security credentials to such outside entities or employees within the enterprise not meant to be in possession of such credentials. Further, any retrieved security credentials may not be stored at the Boomi® platform outside of a temporary cache. This may thus avoid unnecessary storage of the security credential at a third party location (e.g., the Boomi® platform) which may inherently increase security risks.

FIG. 1 is a block diagram illustrating an information handling system, according to an embodiment of the present disclosure. As described herein, the security credential retrieval system 185 in an embodiment may automatically generate code instructions based on user-modeled visual elements for retrieval from a security credential management system of any security credentials required for accessing and migrating password protected data sets from password protected data repositories to destination data repositories. These visual elements may be modeled by a user via a graphical user interfaces (GUI) (e.g., 112), and the integration application management system 180 may operate to generate the associated code instructions.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video, or data communication. The information handling system 100 may include a memory 102, (with computer readable medium 186 that is volatile (e.g. random-access memory, etc.), nonvolatile memory (read-only memory, flash memory etc., or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware controller, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions of the integration application management system 180 or the security credential retrieval system 185, the wireless network interface device 160, a static memory 103 or drive unit 107, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may further include one or more graphical user interfaces 112. The graphical user interface 112 in an embodiment may provide a visual design environment permitting a user to define process flows between applications/systems, such as between trading partner and enterprise systems, and to visually model customized business data integration process code instructions via a video display 109. The graphical user interface 112 in an embodiment may provide a menu of pre-defined user-selectable visual elements or icons and permit the user to arrange them as appropriate to visually model a process and may be displayed on the video display 109. The visual elements may include visual, drag-and-drop icons representing specific units of work required as part of the visually modeled integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular dataset to be sent or received, for example, a Purchase Order. The providing of this input by the user results in the integration application management system's 180 receipt of such user-provided information as an integration process data profile code set.

The information handling system 100 may execute code instructions 187, via one or more hardware processing resources, such as for the integration application management system 180, or the security credential retrieval system 185, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or other hardware controllers or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing, via hardware processing resources, an integration application management system 180, or the security credential retrieval system 185, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 120 via a dedicated link, a network AP or base station in an embodiment. The network 120 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 120 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 120, one or more access points (APs) or base stations for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 120, such that the information handling system 100 may be in communication with network 120 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN bands which may be shared communication frequency bands with WWAN protocols in some embodiments. The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 120. Further, the instructions 187 may be transmitted or received over the network 120 via the network interface device 160. The information handling system 100 may include a set of instructions 187 that may automatically generate code instructions for an integration process for migrating password protected data sets from one or more password protected data repositories to a destination data repository and for retrieving security credentials needed to access those password protected data repositories from a security credentials management system. For example, instructions 187 may include a particular example of an integration application management system 180, or the security credential retrieval system 185, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The integration application management system 180, the visual integration modeling system 182, or the security credential retrieval system 185 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the integration application management system 180, or the security credential retrieval system 185, firmware or software algorithms, processes, and/or methods may be stored here.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the integration application management system 180 or the security credential retrieval system 185 may be stored in static memory 103, or the drive unit 107 on a computer-readable medium 186 such as a flash memory or magnetic disk in an example embodiment.

The disk drive unit 107, static memory 103, and computer readable medium 186 of the integration application management system 180, or the security credential retrieval system 185 also utilize space for data storage such as an information handling system for managing locations of executions of customized integration process code instructions in endpoint storage locations. Connector code sets, and trading partner code sets may also be stored in part in the disk drive unit 107, static memory 103, or computer readable medium 186 accessed or used by the integration application management system 180, or the security credential retrieval system 185 in an embodiment. In other embodiments, data profile code sets, and run-time engines may also be stored in part or in full in the disk drive unit 107, static memory 103, or computer readable medium 186. Further, the instructions 187 of the integration application management system 180, or the security credential retrieval system 185 may embody one or more of the methods or logic as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® hardware processors, ARM® hardware processors, Qualcomm® hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
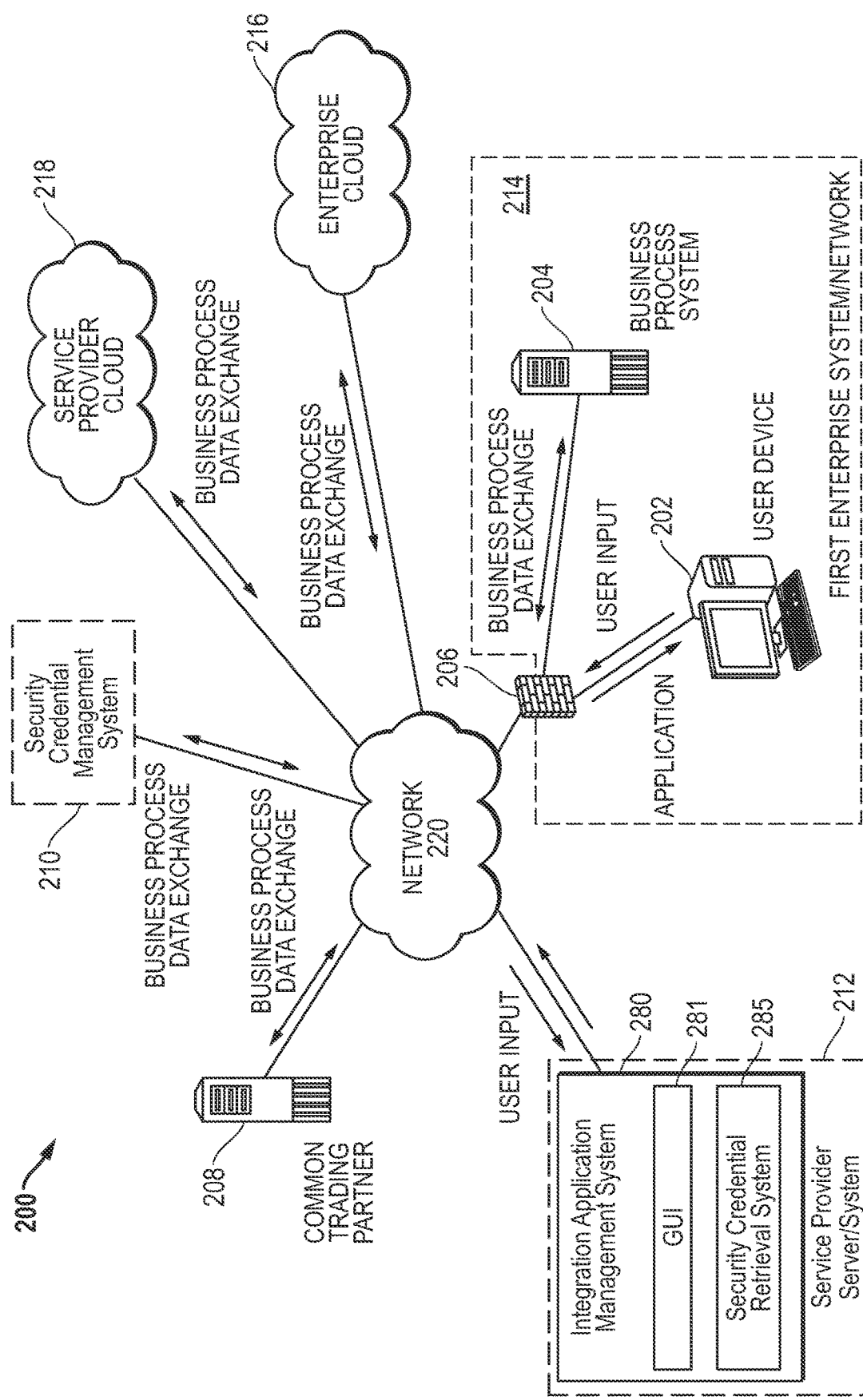
FIG. 2 is a block diagram illustrating a simplified integration network according to an embodiment of the present disclosure.

FIG. 2 is a graphical diagram illustrating a simplified integration network 200 including a service provider system/server 212 and an enterprise system/network 214 in an embodiment according to the present disclosure. Actual integration network topology could be more complex in various other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 220, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 220. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, SalesForce's® Customer Relationship Management (CRM) Platform, Oracle's® Netsuite Enterprise Resource Planning (ERP) Platform, Infor's® Warehouse Management Software (WMS) Application, or many other types of databases. One or more of these software applications or databases may be password protected in various embodiments herein.

The enterprise, which may act as a user for the service provider server/system 212 (e.g., Boomi®) in various embodiments herein may also access data sets stored within a cloud-based data repository, or enterprise cloud 216. Such a cloud-based data repository in various embodiments may also be password protected, and may contain sensitive enterprise business, employment, medical, or accounting information. For example, the enterprise cloud 216 may include conventional computer hardware and commercially available business process software such as QuickBooks, SalesForce's® Customer Relationship Management (CRM) Platform, Oracle's® Netsuite Enterprise Resource Planning (ERP) Platform, Infor's® Warehouse Management Software (WMS) Application, or many other types of databases. The enterprise user in an embodiment may access more than one of these cloud-based password protected data repositories during a single password protected data integration process.

In an embodiment, the integration network 200 may further include trading partner 208 operating conventional hardware and software for receiving and/or transmitting data relating to business-to-business transactions. For example, Amazon® may operate trading partner system 208 to allow for issuance of purchase orders to suppliers, such as the enterprise 214 or enterprise cloud 216, and to receive invoices from suppliers, such as the enterprise 214 or enterprise cloud 216, in electronic data form as part of electronic data exchange processes. Electronic data exchange process in an embodiment may include data exchange via the world wide web. In other embodiments, electronic data exchange processes may include data exchange via File Transfer Protocol (FTP) or Secure File Transfer Protocol (SFTP). The trading partner 208 in an embodiment may act as a destination data repository for the migration of password protected data sets from the enterprise system/network 214 or enterprise cloud 216 pursuant to execution of a password protected data integration process modeled by visual elements, as described in greater detail below with respect to FIGS. 3, 4, and 5.

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214 and the enterprise cloud 216. The service provider system/server 212 in an embodiment may host a visual integration process code instructions-modeling user interfaces 281 in an embodiment, via execution of code instructions for a integration application management system 280, which may also be further manipulated via the code instructions of the security credential retrieval system 285, to automatically generate integration process-representing visual elements. Such a visual integration process code instructions-modeling user interface 281 may allow a user, with the integration application management system 280 or the security credential retrieval system 285, to visually model integration process code instructions including one or more sub-processes for a password protected data integration through a business process data exchange between an enterprise system/network 214 or enterprise cloud 216 and outside entities such as trading partner system 208, security credential management system 210, or service provider cloud 218 or between multiple internal applications operating at the business process system 204 according to embodiments herein.

As described herein, in some cases, data sets or data elements migrated from one data repository (e.g., 214 or 216) to another (e.g., 208) using integration processes modeled with visual elements as described in greater detail below with respect to FIGS. 3, 4, and 5 may be password protected. Such password protected data integration processes may thus require providing such passwords or security credentials to the data repository (e.g., 214 or 216) from which the password protected data sets may be migrated. For example, an password protected data integration process modeled via visual elements using a graphical user interface (GUI) 281 of the integration application management system 280 may involve a separate integration process or sub-process of supplying a password or security credentials to a secure data repository (e.g., SalesForce® platform or other client relationship management (CRM) platforms, or Oracle's® Netsuite Enterprise Resource Planning (ERP) Platform within 214 or 216) in order to access password protected data sets that may contain sensitive client, employee, or business information (e.g., client contact information, invoice or billing information). This password or security credentials usage may be an early step within a larger password protected data integration process for migrating one or more of such password protected data sets from the password protected or secure data repository (e.g., 214 or 216) to a remote destination data repository 208 (e.g., Trading partner, Infor's® Warehouse Management Software (WMS) Application). In some embodiments, this remote destination data repository may also operate within the enterprise cloud 216 and may be managed by the same enterprise user that provided the security credentials to access the password protected data repository (e.g., within 214 or within another software application of the enterprise cloud 216).

Enterprise users routinely store sensitive information within a plurality of such cloud-based or enterprise managed platforms (e.g., 214 or 216), each often requiring separate passwords, or recommending use of different passwords. In order to keep track of the growing volume of passwords required by enterprise users, many have begun using secrets managers or security credential management systems (e.g., 210) such as HashiCorp® Vault, LastPass®, or 1Password®. Such security credential management systems (e.g., 210) allow enterprise users to supply a single keychain password, authentication token, or machine-linked application role, or a handful of such keychain passwords, usually known to only select enterprise employees, such as an Information Security (InfoSec) team member, an individual contributor (IC) level member of technical staff that manages visual data integration processes, or other operations staff, to access all of the passwords or security credentials necessary to access the enterprise's many password protected data repositories within 214 or 216 (e.g., Sales-Force®, Netsuite®, etc.). In order to perform a password protected data integration process modeled using the visual elements via GUI 281, these security credentials for any involved password protected data repositories (e.g., within 214 or 216) must either be supplied by the integration application management system 280 user, or must be retrieved from the security credentials manager 210, requiring the user to supply the single keychain password, authentication token, or machine-linked application role for accessing the security credentials manager 210.

The integration application management system 280 user may provide, via GUI 281, the single keychain password, authentication token, or machine-linked application role required to access the security credentials manager 210 within such a flow of visual elements representing steps of retrieving security credentials needed to access the password protected data sets at 214 and 216 to be migrated as part of the password protected data integration process. The code instructions for the password protected data integration process modeled using these visual elements may then execute to access the security credentials management system 210, retrieve any security credentials for involved password protected data repositories within 214 or 216, and perform the modeled migration of password protected data sets from these password protected data repositories 214 or 216 to the destination data repository 208 or another software application within 214 or 216. In some embodiments, as described below with respect to FIG. 3, the process of accessing the passwords at the security credential management system 210 may be modeled as a password retrieval integration process via GUI 281. The security credentials retrieved in such a way may be stored only temporarily in a cache at the integration application management system 280, and may not be accessible to third party employees of the service provider server/system 212. Thus, this avoids unnecessary security risks posed by storage of security credentials at third-party locations other than the enterprise system 214, the destination data repository 208, and the security credential management system 210. This password retrieval integration process may be modeled separately from the password protected data integration process described in greater detail with respect to FIG. 4 and modeled via GUI 281 that uses the security credentials retrieved pursuant to the password retrieval integration process in order to access and migrate password protected data sets from the password protected data repository (e.g., within a first portion of 214 or 216) to a destination data repository (e.g., 208 or within a second portion of 214 or 216).

As described herein, execution logs listing each of the datasets migrated during any integration process, including the password retrieval integration process and the password protected data integration process described directly above may be generated automatically in order to demonstrate compliance with customer instructions, government data privacy regulations, for audit reasons, or for tracking errors. These logs may consequently list any keychain passwords transmitted from the enterprise user 214. There is some chance that these execution logs may be viewed by entities outside the enterprise 214, such as by an enterprise user's customers, auditors, or by a government entity. Retrieval of the security credentials within a password retrieval integration process that is modeled separately from the password protected data integration process isolates the keychain password transmitted during execution of the password retrieval integration process from execution logs for the separate password protected data integration process. This is one way that utilization of the embodiments herein with the integration application management system 280 at the service provider system 212 may limit unauthorized access by users who do not have security access to the secure credentials needed to access those passwords.

A processor executing code instructions of a security credential retrieval system 285 in an embodiment may further secure the passwords or security credentials supplied to or retrieved from the security credentials management system 210 by obscuring identification of these passwords within execution logs describing data sets migrated pursuant to the password retrieval integration process. The security credential retrieval system 285 in an embodiment may receive user instructions via the GUI 281 regarding storage, caching, retrieval timing, masking, and encryption for the single keychain password, authentication token, or machine-linked application role or various security credentials for accessing password protected data repositories (e.g., within 214 or 216). For example, the security credential retrieval system 285 may generate connector code sets in an embodiment for execution within the modeled password retrieval integration process or within the password protected data integration process for storing retrieved security credentials for password protected data repositories (e.g., within 214 or 216) within a memory cache at the location in which the password protected data integration process is executed (e.g., within 214, 216, or 218). In such an embodiment, the security credential retrieval system 285 may further allow the user to define the frequency with which such a cache is erased to ensure storage of these security credentials for as short a time as possible. In other embodiments, in which the user models the password protected data integration process to include the password retrieval integration process, as described in greater detail below with respect to FIG. 5, the keychain password may be supplied directly to the security credential management system 210, which may transmit a security credential directly to the common trading partner 208. In such an embodiment, the security credentials accessed using the keychain password may never be stored at the service provider server/system 212. In either the case where the security credentials is only temporarily cached, or in which the security credentials are never stored, even in temporary form at the service provider server/system 212, the current disclosure avoids security risks inherent with unnecessary storage of security credentials at third-party sites (e.g., the service provider server/system 212).

As another example, a processor executing code instructions of the security credential retrieval system 285 may generate connector code sets based on user input provided within the modeling process via GUI 281 to encrypt the data set field name or value for the single keychain password, authentication token, or machine-linked application role required for accessing the password protected data repositories (e.g., 214, 216). These connector code instructions may cause execution logs generated following each execution of the visually modeled password retrieval integration process or the password protected data integration process to report the migrated or retrieved single keychain password, authentication token, or machine-linked application role used to access security credentials for the password protected data repositories (e.g., 214 or 216) to appear as encrypted ciphertext within the field name, field value (e.g., password itself), or both. In other words, while the automatically generated execution log may still identify that a dataset has been transferred, the data field name and data field value may both be reported in ciphertext such that anyone viewing that execution log, including enterprise users not usually in possession of security credentials or keychain passwords, and any entity outside of the enterprise, such as auditors, may not be capable of deciphering the keychain password transmitted.

In the case where the password protected data integration process includes retrieval of the security credentials from the security credentials management system 210, as described in greater detail below with respect to FIG. 5, an execution log listing both the single keychain password, authentication token, or machine-linked application role and the retrieved security credentials may be generated and supplied to a user of the GUI 281. In such an embodiment, reporting of the single keychain password, authentication token, or machine-linked application role or a handful of keychain passwords in encrypted ciphertext within such an execution log may obscure the single keychain password, authentication token, or machine-linked application role from being viewable, and may not be supplied to users who are not already in possession of the single keychain password, authentication token, or machine-linked application role.

In the case where the password retrieval integration process is executed and modeled separately from the password protected data integration process, as described in greater detail below with respect to FIGS. 3 and 4 respectively, an execution log listing the single keychain password, authentication token, or machine-linked application role or handful of keychain passwords may be generated and supplied to a user of the GUI 281. In such an embodiment, the execution log reporting transmission of the single keychain password, authentication token, or machine-linked application role may only be viewed by users already in possession of the single keychain password, authentication token, or machine-linked application role or handful of keychain passwords, but may also report the single keychain password, authentication token, or machine-linked application role or handful of keychain passwords in encrypted ciphertext for added security. Thus, in the event such an execution log from a password retrieval integration process must be viewed or produced for regulatory or other reasons or reviewed by non-security access authorized persons such as for an audit, the keychain password(s) and secure data may be shielded and protected. The execution log for the password protected data integration process in such an embodiment may be available to users of the GUI 281, but may not include any mention of the single keychain password, authentication token, or machine-linked application role, as it was only shared with the security credential management system 210 within the separately executed password retrieval integration process. In other words, logs generated during execution of the password retrieval integration process that may track migration of the keychain password such that the keychain password, fields describing security credentials, other security credentials, or retrieved sensitive data fields may not be viewable by the user modeling the separate password protected data integration process, including outside auditors overseeing execution of the separate password protected data integration process. In such a way, the user may model within a subprocess of the data integration process being modeled additional steps of changing the data set field name or value for the supplied single keychain password, authentication token, or machine-linked application role or retrieved security credentials to appear within any later generated execution log as encrypted ciphertext and generating a key that would be required to unencrypt the same. This may ensure that the execution logs may not disclose the single keychain password, authentication token, or machine-linked application role or any retrieved security credentials to employees within the enterprise, services administrators at service provider system 212, auditors, or others not meant to be in possession of such credentials.

The password protected data integration process code instructions visually modeled in the visual integration process-modeling user interface in an embodiment may be a single business process data exchange shown in FIG. 2, or may include several business process data exchanges shown in FIG. 2. For example, one or more common trading partners 208 may be involved in a business process data exchange via network 220 with the enterprise system/network 214 or the enterprise cloud 216. In other example embodiments, the enterprise system/network 214 may be involved in a business process data exchange via network 220 with a security credential management system 210. For example, one or more applications between which a dataset field value may be transferred, according to embodiments described herein, may be located remotely from the enterprise system 214, at a service provider cloud location 218 (e.g., for storage of security credentials or passwords required for modeled integration processes), or one or more enterprise cloud locations (e.g., 216).

The code instructions for the integration application management system and visual integration modeling system having an integration process code instructions-modeling user interface may be used with the execution of code instructions for a security credential retrieval system 285 in an embodiment to visually model one or more business process data exchange code instructions via network 220 within the password protected data integration process code instructions by adding one or more visual connector integration elements corresponding to code sets of a visually modeled integration process flow. These connector integration visual elements in an embodiment may visually model the ways in which a user wishes data to be accessed, moved, and/or manipulated during execution of the one or more business process data exchange code instructions. Each connector visual element the security credential retrieval system 285 or the user adds to the integration process code instructions flow diagram in the visual integration modeling system in an embodiment may be associated with a pre-defined subset of code instructions stored at the service provider systems/server 212 in an embodiment. Upon the user visually modeling the password protected data integration process, the service provider system/server 212 in an embodiment may generate a run-time engine capable of executing the pre-defined subsets of code instructions represented by the connector integration visual elements chosen by the user or indicated by the security credential retrieval system 285.

The runtime engine may then execute the subsets of code instructions in the order defined by the visually modeled flow of the visual connector integration elements given in the password protected data visual integration process code instructions flow diagram. As described herein, the security credentials for accessing the password protected data repositories (e.g., within 214 or 216) may be retrieved within the same password protected data integration process for migrating the data sets protected by those retrieved passwords, or may be retrieved in a separately executed password retrieval integration process. In the case where the password retrieval integration process executes separately from the password protected data integration process, the service provider server/system 212 may provide separate runtime engines for each of the modeled integration processes. Also, the password retrieval integration process in such an embodiment may be executed prior to each execution of the password protected data integration process or may be executed on a routine basis not tied to the frequency of execution of the password protected data integration process. For example, the password retrieval integration process may execute daily to retrieve any security credentials from the security credential management system 210 that may be used within one or more password protected data integration processes planned for execution in the near future. In still another embodiment, execution of the password protected data integration process may trigger tandem execution of the password retrieval integration process.

In each of these embodiments, the enterprise user may be required to provide the single keychain password, authentication token, or machine-linked application role only once, during the modeling of the password retrieval integration system or the password protected data integration process, which allows for retrieval of several security credentials for a plurality of password protected data repositories (e.g., within 214 or 216). In addition, changes to any one of these several security credentials at the security credential management system 210 may not require any changes to the modeled password retrieval integration system, and may not require employees or services administrators at the service provider system 212 to reenter the new passwords within the modeled password retrieval integration system. In such a way, the password protected data integration process code instructions may be executed to retrieve and transfer data from password protected data repositories (e.g., databases) without the user having to access, read, or write the code instructions of such a custom-programmed password protected data business data integration process to enter or use passwords. The execution runtime atom code instructions to conduct such a visually-modeled password protected data business integration process may still provide additional security protection should the result or execution logs of such processes be audited or reviewed by those not privy to the security credentials or passwords used according to embodiments herein.

Figure 3:
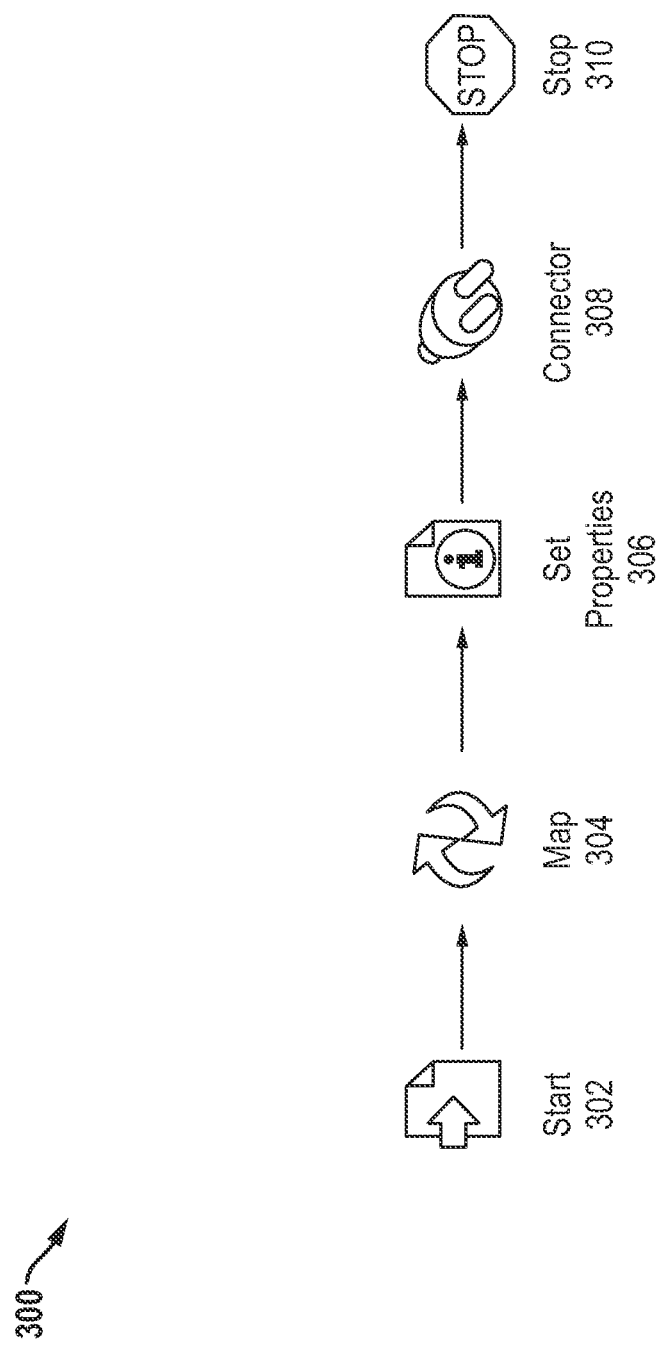
FIG. 3 is a graphical diagram illustrating a user-generated flow diagram of a password retrieval integration process modeled with a visual integration modeling system by a user according to an embodiment of the present disclosure.

FIG. 3 is a graphical diagram illustrating a visual model for a user-generated flow diagram 300 of a password retrieval integration process for exchange or retrieval of electronic data records including security credentials for later use during a password protected data integration process according to an embodiment of the present disclosure. As described herein, embodiments of the present disclosure allow a user in possession of a single keychain password, authentication token, or machine-linked application role known only to select enterprise employees, such as an Information Security (InfoSec) team member, an individual contributor (IC) level member of technical staff that manages visual data integration processes, or other operations staff, to provide all security credentials necessary to complete a password protected data migration process at the time of modeling the visual elements with an adjacent or nested password retrieval integration process. This may also negate any need to update the password protected data integration process for migration of secure or sensitive data from or to sources requiring password access following any change in any related security credentials stored at the security credential management system. The execution of code instructions of a security credential retrieval system allows users to model a password retrieval integration process either as a separate individual flow chart, as shown in FIG. 3 for a password protected data migration process shown in FIG. 4, or alternatively the password retrieval integration process may be nested within the flow chart for a password protected data integration process that uses such retrieved passwords or security credentials, as shown in FIG. 5 below. In both of these cases, the enterprise user in possession of the keychain password may enter this password within the visual elements modeling the password retrieval integration process either as a separate individual password retrieval integration process referred to by a password protected data integration process or as nested within the password protected data integration process). Further, by entering this keychain password during the modeling process in a password retrieval integration process and using the remotely secure the security credential management system that is separately hardened against outside attacks, the enterprise user in possession of the keychain password may avoid having to reenter the keychain password each time the security credentials are changed at the security credential management system for particular password protected data repositories that may be called in a visually modeled password protected data integration process.

In another aspect of an embodiment, modeling the password retrieval integration process separately from the password protected data integration process may separate the involvement and access to the individual passwords and security authentication aspects away from enterprise users who are not regularly in possession of such security credentials or third-party entities such as auditors or employees of the service provider server/system (e.g., Boomi® personnel) that maintain the system that generates code instructions for these integration processes. A user who is in possession of a single keychain password, authentication token, or machine-linked application role, or a handful of keychain passwords used to access several sensitive security credentials that may be used to access password protected data repositories may enter that single keychain password, authentication token, or machine-linked application role into a GUI, as shown in FIG. 3, in a separate password retrieval integration process to retrieve these security credentials that may then be accessed or called upon by a password protected data integration process as modeled within a GUI in FIG. 4, below. The password protected data integration process as modeled within a GUI in FIG. 4 may then access, transform, and transfer data from password protected databases or to password protected databases for example but the execution log from the password protected data integration process is separate from an execution log of the password retrieval data integration process. Another, second user who is not in possession of the single keychain password, authentication token, or machine-linked application role may be tasked with modeling the password protected data integration process flow for retrieving password protected data using the security credentials that is separately retrieved using the keychain password of the password retrieval integration process. In many cases, the password protected data integration process flow for retrieving password protected data may be a more involved and complicated integration process visual modeling process than the password retrieval integration process. Such a second user whose does not regularly have access to the keychain password(s), such as a consultant at an integration modeling management service, may model the password protected data integration process, and may model that process to invoke the separately modeled password retrieval integration process modeled by the user with access to the single keychain password, authentication token, or machine-linked application role and its access to the remotely secured security credential management system. In such a way, the second user may model an integration process for accessing password protected data without having access to the security credentials necessary to access that password protected data or the single keychain password, authentication token, or machine-linked application role. In fact, the second user may not even be aware of the location (e.g., secure credential management platform) or method by which the security credentials have been retrieved. This may provide added security for the single keychain password, authentication token, or machine-linked application role. In addition, any changes made to the single keychain password, authentication token, or machine-linked application role may be addressed by the first, user adjusting the password retrieval integration process displayed in an example embodiment in FIG. 3 without any need for the second user to adjust the password protected data integration process, as described in FIG. 4, below.

In other cases, the password retrieval integration process described with reference to FIG. 3 may be modeled by the same user that models the separate password protected data integration process described in greater detail below with respect to FIG. 4. Nonetheless, as described in greater detail herein, this may still ensure that execution logs describing the retrieval of security credentials using the keychain password are not viewable by outside entities as part of a separated execution log, such as auditors who seek to ensure compliance of the separately modeled password protected data integration process with contract or governmental requirements. However, even so, such keychain password or other security credentials or sensitive data described or shown in execution logs may still be encrypted in log entries according to embodiments herein as an added layer of security.

A user may provide the single keychain password, authentication token, or machine-linked application role required to access the security credentials manager within a visual integration process flow diagram of visual elements, as described with respect to FIG. 3, representing steps of retrieving security credentials in the separately-modeled and executed password retrieval integration process that may be then needed to access the password protected data sets. The password protected data integration process in embodiments may use these security credentials, via linking to the adjacent password retrieval integration process, to access and migrate those password protected data sets when the general password protected data integration process calls the password retrieval integration process. The code instructions for the password protected data integration process modeled using these visual elements may then execute, as described with respect to FIG. 4, below, to access the security credentials management system via the separate password retrieval integration process described with respect to FIG. 3, retrieve any security credentials for involved password protected data repositories, and perform the modeled migration of password protected data sets from these password protected data repositories to the destination data repository.

In other aspects of an embodiment, the security credentials retrieved during execution of the password retrieval integration process may be stored only temporarily within a user-selected cache. The password protected data integration process described with respect to FIG. 4 below may automatically retrieve such temporarily cached security credentials prior to routine clearing of the cache. Further, the user who models either or both of the password retrieval integration process and the password protected data integration process may define or select the frequency with which such as a cache is cleared, or triggers for clearing such a cache. In some cases, the password protected data integration process may be set to initiate to access the security credentials within the cache immediately upon each successful execution of the password retrieval integration process, and to clear the cache as soon as the security credentials are retrieved from the cache via execution of the password protected data integration process. In such a case, the security credentials may be stored only ephemerally, which may decrease any chance of a third-party accessing such a cache or the security credentials stored within.

In another aspect of embodiments described herein, users may mask or obscure any disclosure of security credentials or keychain passwords used in such an execution within automatically generated execution logs. Execution of these integration processes results in generation of an execution log that lists each of the data sets so migrated, including the security credentials or keychain passwords provided by the user, secure data itself such as personal information, or descriptions of such data. Such execution logs may be generated automatically in embodiments herein in order to record execution but also demonstrate compliance with customer instructions, government data privacy regulations, or for tracking errors made during data integration process execution. These execution logs may list each of the datasets migrated during execution of a given integration process. For example, in an integration process that involves transmission of a keychain password and receipt of a security credential at an enterprise user, an execution log showing the keychain password and the retrieved security credential may be automatically generated. Further, there is some chance that these logs may be viewed by entities outside the enterprise, such as by an enterprise user's customers, consultants, auditors, or by a government entity, as may occur during government privacy audits, for example. Embodiments described herein ensure that automatically generated execution logs show the single keychain password, authentication token, or machine-linked application role known only to select enterprise employees, such as an Information Security (InfoSec) team member, an individual contributor (IC) level member of technical staff that manages visual data integration processes, or other operations staff only in encrypted format, and in some cases, disallows access to execution logs displaying the single keychain password, authentication token, or machine-linked application role in encrypted format by general Boomi® enterprise users who would not normally be in possession of such a single keychain password, authentication token, or machine-linked application role.

The user in possession of the single keychain password, authentication token, or machine-linked application role may also model additional steps of changing the data set field name or value for the supplied single keychain password, authentication token, or machine-linked application role or retrieved security credentials to appear as encrypted ciphertext in execution logs automatically generated upon each execution of the password retrieval integration process, in an embodiment which the user in possession of the single keychain password, authentication token, or machine-linked application role models the password retrieval integration process separately from the password protected data integration process, in order to further ensure security of the single keychain password, authentication token, or machine-linked application role. In such a way, the security credential retrieval system may ensure that the execution logs may not disclose the single keychain password, authentication token, or machine-linked application role or any retrieved security credentials to employees within the enterprise or others not meant to be in possession of such credentials.

As also described herein, the integration application management system for executing end-to-end business integration process code instructions among trading partners may include a visual integration modeling system code instructions for generating a visually modeled flow diagram as shown in FIG. 3. The integration application management system in an embodiment may also trace or map dataset field values as they are accessed, copied, transferred, or otherwise manipulated during the transfer of such dataset field values within a visually modeled integration process. This may involve identifying which of these dataset field names was applied at each trading partner, application, or API involved in the visually modeled business data integration process, and the manipulation or action performed by or for each of these trading partners, applications, or APIs during the visually modeled business data integration process. The visual elements 302, 304, 306, 308, and 310 displayed within FIG. 3 may represent one or more steps in data integration process code instructions for retrieving security credentials in a separate password retrieval integration process for accessing a password protected data repository from a security credentials management system in an embodiment. Another set of visual elements similar to those of FIG. 3 may represent steps in data integration process code instructions for migrating password protected data sets from the password protected data repositories using these retrieved security credentials, for example, as described in greater detail below with respect to FIG. 4.

As described herein, in some cases, data sets or data elements migrated from one data repository to another may be password protected, as in the visually-modeled integration process according to a user-generated flow diagram 400. Such integration processes may thus require providing such passwords or security credentials to the data repository from which the password protected data sets may be migrated. This may be an early step within a larger integration process for migrating one or more of such password protected data sets from the password protected or secure data repository to a remote destination data repository. Such passwords and security credentials may be accessed via a security credential management system via a separate password retrieval integration process modeled with visual elements as shown in the integration process flow diagram 300 of FIG. 3. Security credential management systems allow enterprise users to supply a single keychain password, authentication token, or machine-linked application role, usually known to only select enterprise employees, such as an Information Security (InfoSec) team member, an individual contributor (IC) level member of technical staff that manages visual data integration processes, or other operations staff, to access all of the passwords or security credentials necessary to access the enterprise's many password protected data repositories. In order to perform a visually modeled integration process for a separate password retrieval integration process according to a user-generated flow diagram 300 of the integration process in an embodiment, these security credentials for any involved password protected data repositories may be retrieved from the security credentials manager using a single keychain password, authentication token, or machine-linked application role supplied by a user according to embodiments herein. This separate password retrieval integration process may then be invoked by the general password protected data integration process of FIG. 4 to access for transfer and transformation of the password protected data.

Figure 4:
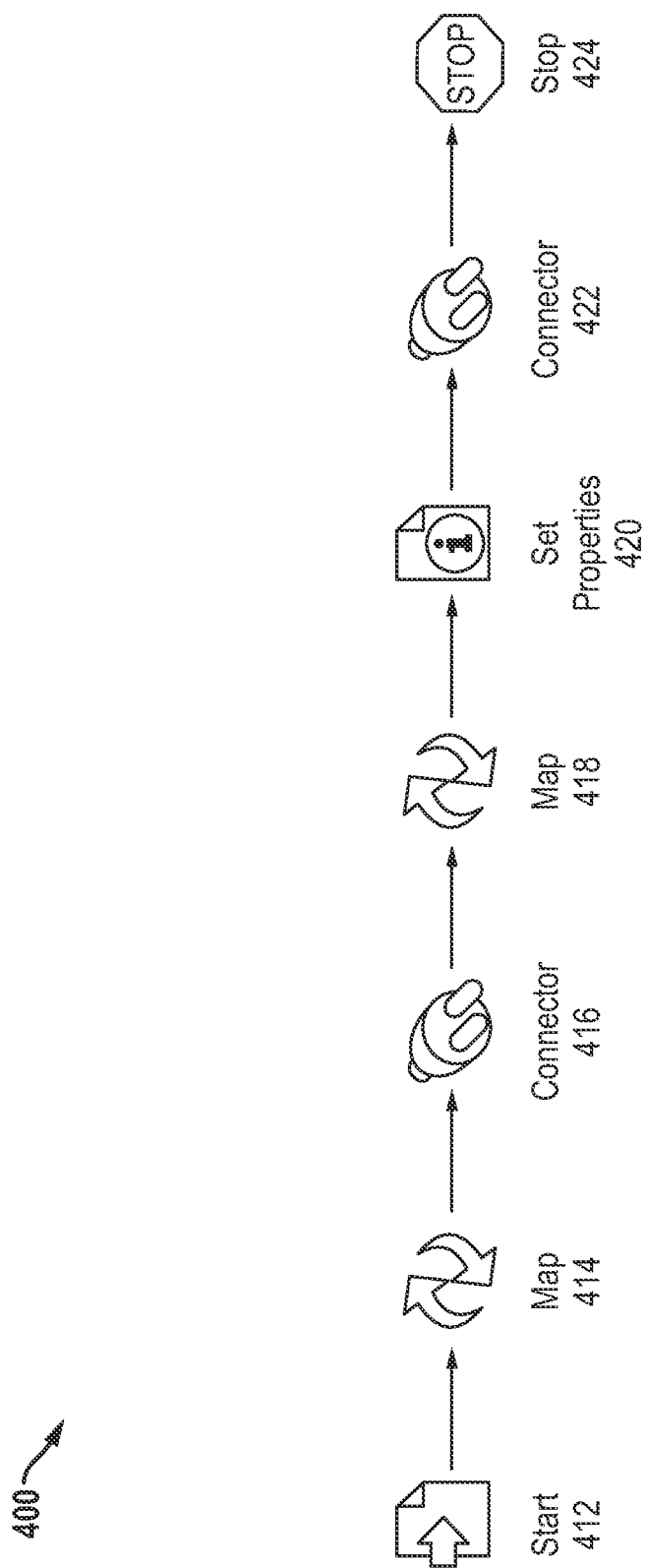
FIG. 4 is a graphical diagram illustrating a user-generated flow diagram of a password protected data integration process by a user according to a first embodiment of the present disclosure.

The integration application management system user may provide, via a GUI, the single keychain password, authentication token, or machine-linked application role required to access the security credentials manager within such a flow of visual elements representing steps of retrieving security credentials as a separate password retrieval integration process according to a user-generated flow diagram 300 needed to access the password protected data sets to be migrated as part of the password protected data integration process according to a user-generated flow diagram 400 (e.g., as described in greater detail below with respect to FIG. 4). The code instructions for the password protected data integration process modeled using these visual elements may then execute to access the security credentials management system, retrieve any security credentials for involved password protected data repositories within, and perform the modeled migration of password protected data sets from these password protected data repositories to the destination data repository.

The visually modeled flow diagram 300 in an embodiment may be displayed within a portion of integration process code instructions flow modeling graphical user interface (GUI) with the visual integration modeling system code instructions that allows the user to build the process flow, deploy the integration process code instructions visually modeled thereby, and manage dataset field names manipulated by such business data integration process code instructions. For example, the separate password retrieval integration process code instructions in an embodiment may include code instructions for transmitting a user-supplied single keychain password, authentication token, or machine-linked application role to a security credentials management system to retrieve one or more security credentials for accessing one or more password protected data repositories during one or more separately executed password protected data integration processes (e.g., as modeled in accordance with an embodiment described with respect to FIG. 4). A user may generate a flow diagram 300 with the visual integration modeling system code instructions in an embodiment by providing a chronology of process-representing integration visual elements via the use of integration process code instructions-modeling user interface. In some embodiments, the integration process-modeling user interface may take the form of a graphical user interface. In such embodiments, the user-selectable visual elements representing integration sub-processes (e.g., connector integration visual elements) may be visual icons such as 302, 304, 306, 308, or 310.

An integration process code instructions-modeling user interface of a visual integration modeling system in an embodiment may provide a design environment permitting a user to visually model and define business data integration process flows according to a user-generated flow diagram 300 for the a separate password retrieval integration process and may access different applications/systems, such as between trading partner and enterprise systems, between on-site data centers and cloud-based storage modules, or between multiple applications, some of which may require provision of security credentials, and to visually model a customized business integration process set of code instructions for the separate password retrieval integration process. Such integration process code instructions-modeling user interface of a visual integration modeling system in an embodiment may provide a menu of pre-defined user-selectable visual elements or icons 302, 302, 306, 308 and 310 representing integration sub-processes and permit the user or the security credential retrieval system to arrange them as appropriate to visually model a full set of code instructions for a business data integration process. For example, in an embodiment in which the integration process-modeling user interface is a graphical user interface, the visual elements may include visual, drag-and-drop icons 302, 302, 306, 308 and 310 representing specific units of work (known as process components) required as part of the later deployed business data integration process code instructions. Such a process component associated with a visual icon in an embodiment may include invoking an application-specific connector to access, and/or manipulate data. In other embodiments, process components associated with visual icons may include tasks relating to transforming data from one format to another, routing data down multiple paths of execution by examining the contents of the data, business logic validation of the data being processed, etc.

Each process component associated with a visual icon as represented by integration sub-process icons or visual elements 302, 302, 306, 308 and 310 may be identifiable by a process component type, and may further include an action to be taken with associated code instructions for the process component and the visual icon. For example, a process component associated with a visual icon 308 may be identified as a "connector" component. Each "connector" component 308, when chosen and added to the process flow in the integration process-modeling user interface of a visual integration modeling system, may allow a user to choose from different actions the "connector" component 308 may be capable of taking on the data as it enters that process step when deployed as code instructions. Further the integration-process modeling user interface in an embodiment may allow the user to choose the dataset or data element upon which the action will be taken when deployed as code instructions. The action and data element the user chooses may be associated with a connector code set, via the integration application management system, which may be pre-defined and stored at a system provider's memory in an embodiment.

As shown in FIG. 3, such process-representing visual elements of a user-generated flow diagram 300 may include a start visual element 302, a map visual element 304, a set properties visual element 306, a connector visual element 308, and a stop visual element 310. Other embodiments may also include a branch visual element, a decision visual element, a data process visual element, or a process call visual element, for example. A connector visual element 308, and a start visual element 302 in an embodiment may represent a sub-process of integration process code instructions describing the accessing and/or manipulation of data for a business data integration process in the visual model flow diagram 300. The start visual element 302 in an embodiment may also operate as a connector visual element.

In an embodiment, a start visual element 302 may operate to begin a process flow 300, and a stop visual element 310 may operate to end a process flow 300. Each visual element may require user input in order for a particular enterprise or trading partner to use the resulting process. The start visual element 302 in an embodiment may further allow or require the user to provide data attributes unique to the user's specific integration process, such as, for example, the source of incoming data to be integrated. For example, the user of the visual integration modeling system code instructions or the security credential retrieval system may use a connector visual element to define a connection, for example with security credentials management system, and the action to be taken, for example, retrieval of one or more security credentials stored at the security credentials management system. This may happen with a user manually modeling a business data integration process set of code instructions. A user may use a start visual element 302 to further define a location of such data, such as a location or pathway at which the security credentials management system may be accessed and provide necessary credentials to access that location, such as a single keychain password, authentication token, or machine-linked application role, according to the language and storage structure understood by the application managing such data. For example, the language and storage structure may be unique to the security credentials management system. In an embodiment in which the start visual element 302 instructs transmission of the single keychain password, authentication token, or machine-linked application role to the security credentials management system, the GUI user may provide user instructions to require any reporting of the data set field name (e.g., "keychain") or the data set field value (e.g., single keychain password, authentication token, or machine-linked application role specific to the enterprise user) to appear in execution logs in encrypted format, such as in ciphertext.

In an embodiment, dataset field values to be accessed at the start visual element 302 may be identified by a dataset field name given in a format that adheres to the code language and storage structure used by the application/location/enterprise at which such a dataset field value may be accessed. For example, the user may provide the data set field name/value pairs for one or more security credentials to be retrieved from the security credentials management system in a format that adheres to the code language and storage structure used by the security credentials management system.

A map visual element 304, or TransformMap visual element in an embodiment, may associate a first dataset field name for a dataset field value being retrieved from a first application or source with a second dataset field name under which that dataset field value will be stored at a second application or destination. For example, the data set being retrieved from the security credentials management system in an embodiment, as modeled at start visual element 302 may be one or more security credentials for accessing password protected data at password protected data repositories. In such an embodiment, the user may provide the data set field name at which such a security credential may be stored at the security credentials management system, and may use the map visual element 304 to map or associate that data set field name specific to the security credentials management system to another data set field name under which that data set may be stored after it is retrieved from the security credentials management system. Such a retrieved security credential in an embodiment may be stored at the location at which the password retrieval integration process runtime engine is executed (e.g., enterprise 214, enterprise cloud 216 from FIG. 2), or at the service provider server/system or service provider cloud (e.g., 212 or 218 from FIG. 2). The data set field name under which such retrieved security credentials may be stored at such locations pursuant to execution of the modeled password retrieval integration process according to a user-generated flow diagram 300 may adhere to the format required by the storing entity (e.g., by the enterprise system or by the service provider system). As described herein, in an embodiment in which the retrieved security credentials are stored at the service provider server/system, the security credentials retrieved during execution of the password retrieval integration process may be stored only temporarily within a user-selected cache. The password protected data integration process described with respect to FIG. 4 below may automatically retrieve such temporarily cached security credentials prior to routine clearing of the cache. Further, the user who models either or both of the password retrieval integration process and the password protected data integration process may define or select the frequency with which such as a cache is cleared, or triggers for clearing such a cache. In some cases, the password protected data integration process may be set to initiate to access the security credentials within the cache immediately upon each successful execution of the password retrieval integration process, and to clear the cache as soon as the security credentials are retrieved from the cache via execution of the password protected data integration process. In such a case, the security credentials may be stored only ephemerally, which may decrease any chance of a third-party accessing such a cache or the security credentials stored within.

A user in an embodiment may further provide user input related to the map visual element 304 to allow the user to require any reporting of the data set field name or value for the retrieved one or more security credentials to be shown in encrypted format, such as in ciphertext. This may be done in addition to any encryption, as directed by the user, of the data set field value (e.g., the security credential itself), or any encryption of data sets protected by those security credentials (e.g., password protected data sets retrieved during a password protected data integration process such as that described in greater detail with respect to FIG. 4). For example, in an embodiment in which the password retrieval integration process directs retrieval of a password "MyP@$$" that is required in order to access password protected data stored at the user's SalesForce® platform, the data set field name may be "SalesForce_pass." In such an embodiment, the user may direct the encryption of the data set field name "SalesForce_pass" using the map visual element 304.

In order for the security credentials retrieval system in an embodiment to perform such an encryption of the security credentials data set field name during execution of the password retrieval integration process, a version of the retrieved security credentials having the unencrypted data set field name (e.g., "SalesForce_pass") may be temporarily stored or cached in memory at the location at which the runtime engine for the password retrieval integration process is executed. The user may also provide user input defining the frequency with which such a cache or temporary storage location may be erased. For example, the user may specify that such a cache may be erased or cleared daily, weekly, or with each execution of the password retrieval integration process.

Because a single set of integration process code instructions may transmit dataset field values between or among several sources and destinations, a process flow may include several of these mapping visual elements 304, sometimes placed in series with one another. This may result in a single dataset field value receiving several different dataset field names as it moves from various sources to various destinations throughout the integration process.

A set properties visual element 306 in an embodiment may allow the user to set one or more properties for the data sets to be retrieved from the security credentials management system. This may be accomplished by allowing the user to associate a user-defined property with a user-defined parameter, similar to a key-value pair definition. For example, a user may use a set properties visual element to set the property "dataset field value" to an encrypted ciphertext string. As described directly above, the map visual element 304 may be used to encrypt a data set field name, which may be distinct from any encryption of the data set field value (e.g., the security credential itself). The user may use the set properties visual element 306 to direct encryption of the data set field value, or the actual security credential or password retrieved from the security credentials management system. For example, in an embodiment in which the password retrieval integration process directs retrieval of a password "MyP@$$" having a data set field name "SalesForce_pass", the user may direct the encryption of the data set field value "MyP@$$" using the set properties visual element 306. Any execution log generated pursuant to execution of the password retrieval integration process modeled according to a user-generated flow diagram 300 within the GUI may record the retrieved security credentials with these encrypted ciphertext values for either or both the data set field name and data set field value. For example, such an encryption may direct any recordation of such a password in an execution log as a masked value such as "******" or may hash the value to "MyP@$$" to become "533bbdcaa5bc6516fe2617c0077fdf3f73bef7f69fb93cc710 7a79b3fdd93223."

An execution log listing the single keychain password, authentication token, or machine-linked application role or retrieved security credentials in such an encrypted ciphertext format may be generated. In such an embodiment, the execution log reporting transmission of the single keychain password, authentication token, or machine-linked application role or retrieved security credentials may report the single keychain password, authentication token, or machine-linked application role and security credentials in encrypted ciphertext for added security. The execution log for the password protected data integration process modeled in an embodiment described with respect to FIG. 4 below may not include any mention of the single keychain password, authentication token, or machine-linked application role in encrypted or unencrypted format, as it was only shared with the security credential management system within the separately executed password retrieval integration process modeled according to another user-generated flow diagram such as described with respect to FIG. 3. In such a way, the user may model additional steps of changing the data set field name or value for the supplied single keychain password, authentication token, or machine-linked application role or retrieved security credentials to appear within any later generated execution log as encrypted ciphertext. This may ensure that the execution logs may not disclose the single keychain password, authentication token, or machine-linked application role or any retrieved security credentials to employees within the enterprise or services administrators at a service provider such as Boomi®, not meant to be in possession of such credentials.

A user in an embodiment may then create and customize a "connector" component 308 to represent the action of identifying the specific security credentials to be retrieved from the security credentials management system in an embodiment. A connector visual element 308 may operate in a similar manner to the start visual element 302 to define an action to be taken on an identified dataset. For example, the connector visual element 308 in an embodiment may define the storage location at which any retrieved security credentials are stored, either temporarily or in a cache, in encrypted or unencrypted formats. Connector visual elements 308 in an embodiment may differ from start visual elements 302 in that they do not necessarily occur at the beginning of business data integration process code instructions. The stop visual element 310 in an embodiment may operate to terminate the business data integration process code instructions.

The integration application management system in an embodiment may associate each of the visual elements within the integration process-modeling graphical user interface of the visual integration modeling system code instructions with a set of code instructions written in a machine-readable, executable format for each process visual element code set. For example, the integration application management system in an embodiment may associate the start visual element 302 with a connector code set, written or generated in a human-readable, machine-executable code language (e.g., JSON or XML), that includes code instructions for accessing a dataset field value associated with a user-specified dataset field name defined within the start visual element 302. Upon generation and storage within a memory of each of the code sets associated with each of the visual elements 302, 304, 306, 308, or 310 within the integration process-modeling graphical user interface in an embodiment, the integration application management system may further generate a runtime engine capable of executing each of these code sets. The integration application management system in an embodiment may transmit the runtime engine and each of the code sets for execution of the business data integration process code instructions visually modeled by the user or auto-generated via the integration process-modeling graphical user interface of the visual integration modeling system code instructions for execution of the integration process code instructions at a remote location (e.g., behind the firewall of a user's enterprise system/network). Thus, execution of the visually modeled flow diagram 300 illustrated in FIG. 3 may result in accessing the security credentials management system, and retrieving any security credentials for password protected data repositories to be accessed during later execution of a password protected data integration process, as described in greater detail below with respect to FIG. 4.

These code sets in an embodiment may be written or generated in any programming code language, so long as the code language in which the property is defined matches the code language in which the parameter is also defined. Similarly, the code sets associated with the connection location and action to be taken within a connector visual element may be written or generated in any programming code language so long as they are consistent with one another. Thus, the process-representing visual elements in an embodiment may be programming language-agnostic. Using such process-representing visual elements in an embodiment, a user may visually model end-to-end integration process code instructions between multiple applications that each use different naming conventions and storage structures for storage of dataset field values via the visual integration modeling system code instructions of embodiments herein. The integration application management system operating at least partially at a system provider server/system in an embodiment may generate a dynamic runtime engine for executing these pre-defined subsets of code instructions correlated to each individual process-representing visual element (process component) 302, 304, 306, 308, or 310 in a given flow diagram visual model 300 in the order in which they are visually modeled in the given flow diagram visual model 300, or by the security credential retrieval system generating a flow diagram visual model 300.

FIG. 4 is a graphical diagram illustrating a visual model for a user-generated flow diagram 400 of a password protected data integration process for exchange of electronic data records including accessing security credentials previously retrieved during a separate password retrieval integration process generated as above in FIG. 3 according to an embodiment of the present disclosure. As described herein, embodiments of the present disclosure allow a user in possession of a single keychain password, authentication token, or machine-linked application role known only to select enterprise employees, such as InfoSec, IC-Level, or other operations staff to provide all security credentials necessary to complete a password protected data migration process at the time of modeling the visual elements via access to password retrieval integration process generated as above in FIG. 3, without having to update the password protected data migration process when any related security credentials stored at the security credential management system are changed. The security credential retrieval system allows users to model a password retrieval integration process as a separate individual flow diagram 300, as shown in FIG. 3 and utilized within a general password protected data integration process flow diagram 400 of FIG. 4. In an alternative discussed below, security credential retrieval system allows users to model such a password retrieval process as nested within the flow chart for a password protected data integration process that uses such retrieved passwords or security credentials, as shown below in FIG. 5. In both of these cases, the enterprise user in possession of the keychain password may enter this password within the visual elements modeling the password retrieval integration process (either as a separate individual password retrieval integration process of FIG. 3 or as nested within the general password protected data integration process of FIG. 5). The keychain password entered in such a way may be masked from view upon entry into the visual integration element modeling GUI, for example, by showing the entered characters as asterisks or cryptographically represented.

In the present embodiment of FIG. 4, the access to the security credential retrieval system with linking to the separate individual password retrieval integration process of FIG. 3 may ensure that any user modelling the flow of the general password protected data integration process flow diagram 400 does not see the keychain password. Further, by entering this keychain password during the modeling process with the password retrieval integration process, any execution logs generated due to execution of the password protected data integration process may not mention existence or use of a single keychain password, authentication token, or machine-linked application role, as such a keychain password was only used during the separately-executed password retrieval integration process.

In another aspect of an embodiment, modeling the password retrieval integration process to the security credential retrieval system separately from the password protected data integration process may separate the involvement and access to the individual passwords and security authentication aspects away from an enterprise user or third party not normally in possession of these passwords or security credentials. A user who is in possession of a single keychain password, authentication token, or machine-linked application role used to access several sensitive security credentials may enter that single keychain password, authentication token, or machine-linked application role, as shown in FIG. 3, above, while modeling a separate password retrieval integration process to retrieve these security credentials that may then be accessed or called upon by a password protected data integration process as modeled within a GUI in FIG. 4 that must access, transform, and transfer data from password protected databases or to password protected databases for example. Another, second user who is not in possession of the single keychain password, authentication token, or machine-linked application role may be tasked with modeling the integration process flow for retrieving password protected data that requires the security credentials retrieved using the keychain password. In many cases, the general integration process flow diagram such as 400 for retrieving password protected data may be a more involved and complicated integration process visual modeling process that may be delegated to enterprise users not in possession of the keychain passwords or security credentials, or consultants. Such a second user, such as a consultant at an integration modeling management service, may use a GUI to model the password protected data integration process, and may model that process to invoke the separately modeled password retrieval integration process modeled by the user with access to the single keychain password, authentication token, or machine-linked application role (e.g., 300 in FIG. 3). In such a way, the second user may model an integration process for accessing password protected data without having access to the security credentials necessary to access that password protected data or the single keychain password, authentication token, or machine-linked application role. In fact, the second user may not even be aware of the location (e.g., secure credential management platform) or method by which the security credentials have been retrieved which may also be protected. This may provide added security for the single keychain password, authentication token, or machine-linked application role. In addition, any changes made to the single keychain password, authentication token, or machine-linked application role may be addressed by the first, user adjusting the password retrieval integration process displayed in an example embodiment in FIG. 3, above, without any need for the second user to adjust the password protected data integration process, as described in FIG. 4.

The first user may provide, as described in an embodiment in FIG. 3, above, the single keychain password, authentication token, or machine-linked application role required to access the security credentials manager within a visual integration process flow diagram of visual elements representing steps of retrieving security credentials needed to access the password protected data sets in a separately-modeled and executed password retrieval integration process. The password protected data integration process in embodiments may then use these security credentials to access and migrate those password protected data sets via invoking the separate password retrieval integration process. The code instructions for the password protected data integration process modeled using these visual elements may then execute, as described with respect to FIG. 4, to access the security credentials management system via the separate password retrieval integration process described with respect to FIG. 3, above, retrieve any security credentials for involved password protected data repositories, and perform the modeled migration of password protected data sets from these password protected data repositories to the destination data repository.

As described above with respect to FIG. 3, the security credentials retrieved during execution of the password retrieval integration process may be stored only temporarily within a user-selected cache. The password protected data integration process described with respect to FIG. 4 may automatically retrieve such temporarily cached security credentials prior to routine clearing of the cache. Further, the user who models either or both of the password retrieval integration process and the password protected data integration process may define or select the frequency with which such as a cache is cleared, or triggers for clearing such a cache. In some cases, the password protected data integration process may be set to initiate to access the security credentials within the cache immediately upon each successful execution of the password retrieval integration process, and to clear the cache as soon as the security credentials are retrieved from the cache via execution of the password protected data integration process. In such a case, the security credentials may be stored only ephemerally, which may decrease any chance of a third-party accessing such a cache or the security credentials stored within.

Further, the embodiment described with respect to FIG. 4 generates a separate execution log for execution of the password protected data integration process than execution logs generated following execution of the separate password retrieval integration process described above shown in FIG. 3 that may displays the single keychain password, authentication token, or machine-linked application role in encrypted format. In other words, auditors or third parties seeking to ensure compliance of the password protected data integration process itself need not access execution logs for the separately executed password retrieval integration process. Thus, general Boomi® enterprise users who would not normally be in possession of such a single keychain password, authentication token, or machine-linked application role and other third parties will not be delivered a log from the separate password retrieval integration process of FIG. 3 in some embodiments.

As also described herein, execution of the password retrieval integration process (e.g., as modeled in an embodiment described with respect to FIG. 3 above) may result in accessing the security credentials management system, and retrieving any security credentials for password protected data repositories to be accessed during later execution of a password protected data integration process. The user-generated flow diagram 400 illustrated with respect to FIG. 4 may model such a password protected data integration process for retrieval of password protected data sets from one or more password protected data repositories. Such a password protected data integration process, as shown in FIG. 4, may also involve transmission of the security credentials necessary to access such password protected data repositories, as retrieved pursuant to the previously executed password retrieval integration process.

The visual elements 412, 414, 416, 418, 420, 422 and 424 displayed within FIG. 4 may represent one or more steps in data integration process code instructions for retrieving security credentials for accessing a password protected data repository from a security credentials management system in an embodiment. The visually modeled flow diagram 400 in an embodiment may be displayed within a portion of integration process code instructions flow modeling graphical user interface (GUI) with the visual integration modeling system code instructions that allows the user to build the process flow, deploy the integration process code instructions visually modeled thereby, and manage dataset field names manipulated by such business data integration process code instructions. For example, business data integration process code instructions in an embodiment may include code instructions for transmitting one or more security credentials to migrate one or more password protected data sets from a password protected data repository to a destination data repository.

As described herein, the security credential retrieval system in an embodiment may receive user instructions via the GUI regarding storage, caching, retrieval timing, masking, and encryption for the single keychain password, authentication token, or machine-linked application role or various security credentials for accessing password protected data repositories. In the case where the password retrieval integration process is executed and modeled separately from the password protected data integration process, an execution log listing the single keychain password, authentication token, or machine-linked application role known only to select enterprise employees, such as an Information Security (InfoSec) team member, an individual contributor (IC) level member of technical staff that manages visual data integration processes, or other operations staff, and used to access several security credentials for a plurality of password protected data repositories may be generated. In such an embodiment, the execution log reporting transmission of the single keychain password, authentication token, or machine-linked application role may only be viewed by users already in possession of the single keychain password, authentication token, or machine-linked application role, but may also report the single keychain password, authentication token, or machine-linked application role in encrypted ciphertext for added security. The execution log for the password protected data integration process modeled at FIG. 4 in such an embodiment may not include any mention of the single keychain password, authentication token, or machine-linked application role, as it was only shared with the security credential management system within the separately executed password retrieval integration process (e.g., as modeled at FIG. 3). In such a way, the user may model additional steps of changing the data set field name or value for the supplied single keychain password, authentication token, or machine-linked application role or retrieved security credentials to appear within any later generated execution log as encrypted ciphertext. This may ensure that the execution logs may not disclose the single keychain password, authentication token, or machine-linked application role or any retrieved security credentials to employees within the enterprise or others not meant to be in possession of such credentials.

Similar to the GUI described with reference to FIG. 3 above, the GUI of a visual integration modeling system in an embodiment may provide a design environment permitting a user to visually model and define business data integration process flows 400 between applications/systems, such as between trading partner and enterprise systems, between on-site data centers and cloud-based storage modules, or between multiple applications, some of which may require provision of security credentials, and to visually model a customized business integration process set of code instructions. Such integration process code instructions-modeling user interface of a visual integration modeling system in an embodiment may provide a menu of pre-defined user-selectable visual elements representing integration sub-processes and permit the user or the security credential retrieval system to arrange them as appropriate to visually model a full set of code instructions for a business data integration process. For example, in an embodiment in which the integration process-modeling user interface is a graphical user interface, the visual elements may include visual, drag-and-drop icons 412, 414, 416, 418, 420, 422 and 424 representing specific units of work (known as process components) required as part of the later deployed business data integration process code instructions. Such a process component associated with a visual icon in an embodiment may include invoking an application-specific connector to access, and/or manipulate data. In other embodiments, process components associated with visual icons 412, 414, 416, 418, 420, 422 and 424 may include tasks relating to transforming data from one format to another, routing data down multiple paths of execution by examining the contents of the data, business logic validation of the data being processed, etc.

As shown in FIG. 4, such process-representing visual elements may include a start visual element 412, map visual elements 414 and 418, a set properties visual element 420, connector visual elements 416 and 422, and a stop visual element 424. Other embodiments may also include a branch visual element, a decision visual element, a data process visual element, or a process call visual element, for example. A connector visual element 416, 422, and a start visual element 412 in an embodiment may represent a sub-process of integration process code instructions describing the accessing and/or manipulation of data for a business data integration process in the visual model flow diagram 400. The start visual element 412 in an embodiment may also operate as a connector visual element.

In an embodiment, a start visual element 412 may operate to begin a process flow, and a stop visual element 424 may operate to end a process flow. Each visual element may require user input in order for a particular enterprise or trading partner to use the resulting process. The start visual element 412 in an embodiment may further allow or require the user to provide data attributes unique to the user's specific integration process, such as, for example, the source of incoming data to be integrated. For example, the user of the visual integration modeling system code instructions or the security credential retrieval system may use a connector visual element to define a connection (e.g., password protected data repository), and the action to be taken (e.g., retrieval of one or more password protected data sets stored at the password protected data repository). In another example embodiment, the start visual element 412 may be linked to the separate password retrieval integration process described with reference to FIG. 3, or to the start element 302 of that visually modeled flow diagram for the password retrieval integration process such that the start visual element 412 automatically invokes execution of the password retrieval integration process.

A user may use a start visual element 412 to further define a location of such data (e.g., a location or pathway at which the password protected data repository may be accessed) and provide necessary credentials to access that location (e.g., security credentials previously retrieved from the security credentials management system pursuant to a password retrieval integration process), according to the language and storage structure understood by the application managing such data (e.g., the password protected data repository). In an embodiment in which the start visual element 412 instructs transmission of security credentials to the password protected data repository, the GUI user may provide user instructions in the visually modeled flow diagram 400 to require any reporting of the data set field name (e.g., "SalesForce_pass") or the data set field value (e.g., "MyP@$$") to appear in execution logs in encrypted format, such as in ciphertext. For example, such an encryption may direct any recordation of such a password in an execution log as a masked value such as "******" or may hash the value to "MyP@$$" to become "533bbdcaa5bc6516fe2617c0077fdf3f73bef7f69fb93cc710 7a79b3fdd93223."

As described herein, the security credentials retrieved during execution of the password retrieval integration process may be stored only temporarily within a user-selected cache in an embodiment in which the security credentials are stored at the service provider server/system. The password protected data integration process described with respect to FIG. 4 below may automatically retrieve such temporarily cached security credentials prior to routine clearing of the cache. Further, the user who models either or both of the password retrieval integration process and the password protected data integration process may define or select the frequency with which such as a cache is cleared, or triggers for clearing such a cache. In some cases, the password protected data integration process may be set to initiate to access the security credentials within the cache immediately upon each successful execution of the password retrieval integration process, and to clear the cache as soon as the security credentials are retrieved from the cache via execution of the password protected data integration process. In such a case, the security credentials may be stored only ephemerally, which may decrease any chance of a third-party accessing such a cache or the security credentials stored within. In other cases, the security credentials may be stored at the enterprise user's system during execution of the password retrieval integration process, and may never be accessible by employees at the service provider server/system.

In an embodiment, dataset field values to be accessed at the start visual element 412 may be identified by a dataset field name given in a format that adheres to the code language and storage structure used by the application/location/enterprise at which such a dataset field value may be accessed. For example, the user may provide the data set field name/value pairs for one or more security credentials to be retrieved from the password protected data repository in a format that adheres to the code language and storage structure used by the password protected data repository.

A map visual element 414, or TransformMap visual element in an embodiment, may associate a first dataset field name for a dataset field value being retrieved from a first application or source with a second dataset field name under which that dataset field value will be stored at a second application or destination. For example, the password protected data integration process modeled according to a user-generated flow diagram 400 at FIG. 4 may include two primary steps: (1) transmission of security credentials to a password protected data repository; and (2) migration of one or more password protected data sets from that password protected data repository to a destination data repository. The map visual element 414 and the connector visual element 416 may model the first step of this integration process, to instruct transmission of security credentials to a password protected data repository.

As described above with respect to FIG. 3, execution of the password retrieval integration process (e.g., as modeled in an embodiment described with respect to FIG. 3 above) may result in accessing the security credentials management system, and retrieving any security credentials for password protected data repositories to be accessed during later execution of a password protected data integration process. These security credentials may be stored under an encrypted data set field name or have an encrypted data set field value. The data set field name or data set field value may require decryption prior to transmission to the password protected data repository in an embodiment, in order for the password protected data repository to accept the security credentials as correct. The map visual element 414 in an embodiment may map the encrypted data set field name under which the retrieved security credentials were stored pursuant to execution of the password retrieval integration process to a stored copy of the security credentials having an unencrypted data set field name and unencrypted data set field value.

For example, the map visual element 414 may map the storage location for the encrypted security credentials for accessing the enterprise user's SalesForce account as stored at a known location pursuant to execution of the password retrieval integration process to a location at which an unencrypted version of that data set (e.g., having a data set field name "SalesForce_pass" and a data set field value of "MyP@$$") may be stored. Such an unencrypted copy of the retrieved security credential in an embodiment may be stored at the location at which the password protected data integration process runtime engine is executed (e.g., enterprise 214, enterprise cloud 216 from FIG. 2), or at the service provider server/system or service provider cloud (e.g., 212 or 218 from FIG. 2). The data set field name under which such an unencrypted copy of the retrieved security credentials may be stored at such locations pursuant to execution of the modeled password protected data integration process may adhere to the format required by the storing entity (e.g., by the enterprise system or by the service provider system). For example, such an encryption may direct any recordation of such a password in an execution log as a masked value such as "******" or may hash the value to "MyP@$$" to become "533bbdcaa5bc6516fe2617c0077fdf3f73bef7f69fb93cc710 7a79b3fdd93223." The user may also provide user input defining the frequency with which such a cache or temporary storage location at which such an unencrypted copy of the security credentials may be erased. For example, the user may specify that such a cache may be erased or cleared daily, weekly, or with each execution of the password protected data integration process.

A user of the GUI for the user-generated flow diagram 400 in an embodiment may further provide user input related to the map visual element 414 to allow the user to require any reporting of the data set field name or value for the unencrypted copy of the security credentials to be shown in encrypted format, such as in ciphertext. This may be done in addition to any encryption of data sets protected by those security credentials (e.g., password protected data sets retrieved during a password protected data integration process such as that described in greater detail with respect to set properties visual element 420). For example, in an embodiment in which the password retrieval integration process directs storage of a decrypted version of a password "MyP@$$" that is required in order to access password protected data stored at the user's SalesForce® platform, the data set field name may be "SalesForce_pass." In such an embodiment, the user may direct the encryption of any reporting of the data set field name "SalesForce_pass" using the map visual element 414.

A user in an embodiment may then create and customize a "connector" component (e.g., 416) to represent the action of identifying the specific security credentials to be transmitted to the password protected data repository. A connector visual element 416 may operate in a similar manner to the start visual element 412 to define an action to be taken on an identified dataset. For example, the connector visual element 416 in an embodiment may define the storage location at which any unencrypted retrieved security credentials are stored, and an address or pathway for the password protected data repository to which such passwords will be transmitted.

An execution log listing the transmitted security credentials in such an encrypted ciphertext format may be generated for access by a user of the GUI. In such an embodiment, the execution log reporting transmission of the security credentials may only be viewed by users in encrypted ciphertext. The execution log for the password protected data integration process modeled in an embodiment described with respect to FIG. 4 below may not include any mention of the single keychain password, authentication token, or machine-linked application role in encrypted or unencrypted format, as it was only shared with the security credential management system within the separately executed password retrieval integration process modeled at FIG. 3. In such a way, the user may model additional steps of changing the data set field name or value for the supplied single keychain password, authentication token, or machine-linked application role or retrieved security credentials to appear within any later generated execution log as encrypted ciphertext. This may ensure that the execution logs may not disclose the single keychain password, authentication token, or machine-linked application role or any retrieved security credentials to employees within the enterprise not meant to be in possession of such credentials.

As described herein, the password protected data integration process modeled at FIG. 4 may include two primary steps: (1) transmission of security credentials to a password protected data repository; and (2) migration of one or more password protected data sets from that password protected data repository to a destination data repository. The map visual element 418, set properties visual element 420, and the connector visual element 422 may model the second step of this process, to instruct migration of a password protected data set from a password protected data repository to a destination data repository. For example, these visual elements (e.g., 418, 420, 422, 424) may model migration of a data set from a SalesForce® platform containing a customer's contact information (e.g., data set having a data set field name of "address" and a data set field value of "123_Main_St") to a NetSuite® platform for billing the customer.

The map visual element 418 in such an embodiment may map the storage location for the customer's contact information within the SalesForce account to a location within the NetSuite® platform where such information may be stored. The data set field name under which such customer contact may be stored at such locations pursuant to execution of the modeled password protected data integration process may adhere to the format required by the storing entity (e.g., by the NetSuite® platform). A user of the GUI forming the visually modeled integration process flow diagram 400 in an embodiment may further provide user input related to the map visual element 418 to allow the user to require any reporting of the data set field name or value for the customer address to be shown in encrypted format, such as in ciphertext. This may be done in addition to any encryption of security credentials supplied in order to access such password protected customer addresses.

A set properties visual element 420 in an embodiment may allow the user to set one or more properties for the data sets to be retrieved from the security credentials management system. This may be accomplished by allowing the user to associate a user-defined property with a user-defined parameter, similar to a key-value pair definition. For example, a user may use a set properties visual element to set the property "dataset field value" to an encrypted ciphertext string. The user may use the set properties visual element 420 to direct encryption of the data set field value, or the customer address of "123_Main_St." Any execution log generated pursuant to execution of the password protected data integration process may record the migrated password protected data sets (e.g., customer addresses) with these encrypted ciphertext values for either or both the data set field name and data set field value.

A user in an embodiment may then create and customize a "connector" component 422 to represent the action of identifying the specific password protected data set (e.g., customer contact) to be retrieved from the password protected data repository (e.g., SalesForce® platform) and migrated to the destination data repository (e.g., NetSuite® platform) in an embodiment. The stop visual element 424 in an embodiment may operate to terminate the business data integration process code instructions.

The integration application management system in an embodiment may associate each of the visual elements of the visually modeled integration process flow diagram 400 within the integration process-modeling graphical user interface of the visual integration modeling system code instructions with a set of code instructions written in a machine-readable, executable format for each process element code set. For example, the integration application management system in an embodiment may associate the start visual element 412 with a connector code set, written or generated in a human-readable, machine-executable code language (e.g., JSON or XML), that includes code instructions for accessing a dataset field value associated with a user-specified dataset field name defined within the start visual element 412. Upon generation and storage within a memory of each of the code sets associated with each of the visual elements 412, 414, 416, 418, 420, 422, or 424 of the visually modeled integration process flow diagram 400 within the integration process-modeling graphical user interface 400 in an embodiment, the integration application management system may further generate a runtime engine capable of executing each of these code sets for an integration process flow. The integration application management system in an embodiment may transmit the runtime engine and each of the code sets for execution of the business data integration process code instructions visually modeled by the user or auto-generated via the integration process-modeling graphical user interface of the visual integration modeling system code instructions for execution of the integration process code instructions at a remote location (e.g., behind the firewall of a user's enterprise system/network). Thus, execution of the visually modeled flow 400 illustrated in FIG. 4 may result in transmitting security credentials to password protected data repositories, and migration of password protected data sets from the password protected data repositories to a destination data repository. Further, the user may provide additional visual elements to instruct access and migration of password protected data sets from a plurality of different password protected data repositories using a plurality of retrieved security credentials, with each of the plurality of security credentials allowing access to one of the plurality of password protected data repositories.

These code sets in an embodiment may be written or generated in any programming code language, so long as the code language in which the property is defined matches the code language in which the parameter is also defined. Similarly, the code sets associated with the connection location and action to be taken within a connector visual element may be written or generated in any programming code language so long as they are consistent with one another. Thus, the process-representing visual elements 412, 414, 416, 418, 420, 422, and 424 in an embodiment may be programming language-agnostic. Using such process-representing visual elements in an embodiment, a user may visually model end-to-end integration process code instructions between multiple applications that each use different naming conventions and storage structures for storage of dataset field values via the visual integration modeling system code instructions of embodiments herein. The integration application management system operating at least partially at a system provider server/system in an embodiment may generate a dynamic runtime engine for executing these pre-defined subsets of code instructions correlated to each individual process-representing visual element (process component) 412, 414, 416, 418, 420, 422, or 424 in a given flow diagram visual model 400 in the order in which they are visually modeled in the given flow diagram visual model 400, or by the security credential retrieval system generating a flow diagram visual model 400.

Figure 5:
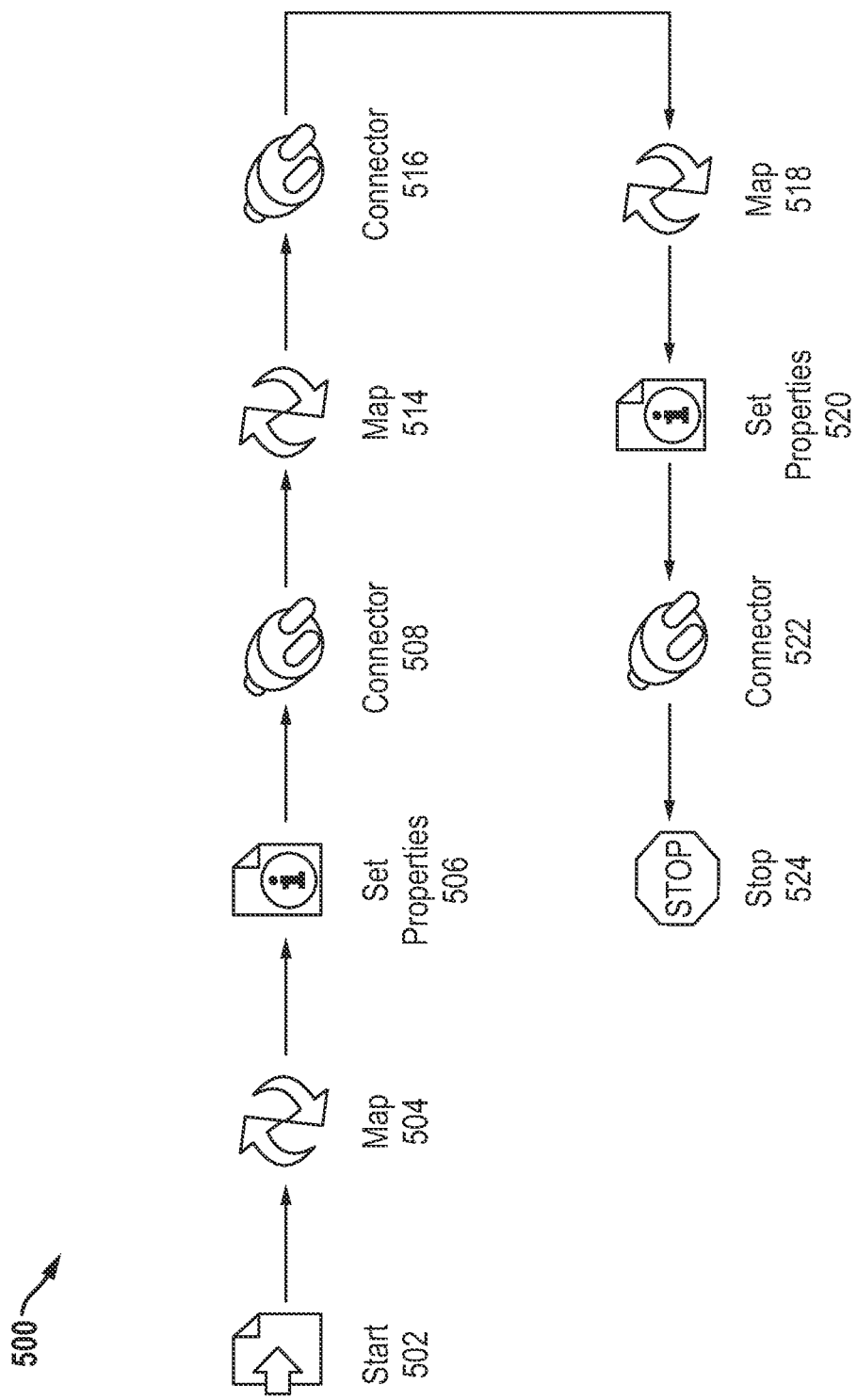
FIG. 5 is a graphical diagram illustrating a user-generated flow diagram of a password protected data integration process by a user according to a second embodiment of the present disclosure.

FIG. 5 is a graphical diagram illustrating a visual model for a user-generated flow diagram of a password protected data integration process for exchange of electronic data records that further includes retrieval of security credentials from a security credentials management system nested within the password protected data integration process but protects log reporting of keychain passwords according to an embodiment of the present disclosure. As described herein, in some embodiments, the enterprise user in possession of the single keychain password, authentication token, or machine-linked application role used to access the security credential management system may also be the user modeling the password protected data integration process. In such embodiments, such a user may provide the single keychain password, authentication token, or machine-linked application role and model the password protected data integration process via a single graphical user interface (GUI), with the user-generated integration process flow diagram 500 described with respect to FIG. 5. In an embodiment in which the password retrieval integration process is modeled as nested within the password protected data integration process, the user in possession of the single keychain password, authentication token, or machine-linked application role may model an additional step of changing the data set field name or data set field value for the supplied single keychain password, authentication token, or machine-linked application role or secured credentials retrieved using that keychain password to appear as encrypted ciphertext in execution logs automatically generated upon each execution of the password protected data integration process that includes the password retrieval integration process.

In addition, in an embodiment in which the user models the password protected data integration process to include the password retrieval integration process, as described with respect to FIG. 5, the keychain password may be supplied directly to the security credential management system, which may transmit a security credential directly to the common trading partner. In such an embodiment, the security credentials accessed using the keychain password may never be stored at the service provider server/system. The current disclosure thus avoids security risks inherent with unnecessary storage of security credentials at third-party sites (e.g., the service provider server/system).

As described herein, users may mask or obscure any disclosure of security credentials used in an execution of the password protected data integration process that includes the password retrieval integration process within automatically generated execution logs. Execution of the password protected data integration process, including the password retrieval integration process results in generation of a single execution log that lists each of the data sets so migrated, including the keychain password used to retrieve the security credentials and security credentials supplied by the enterprise to access the password protected data to be migrated. Such execution logs may be generated automatically in embodiments herein in order to demonstrate compliance with customer instructions, government data privacy regulations, or for tracking errors made during data integration process execution. These execution logs may list each of the datasets migrated during execution of a given integration process. For example, in an integration process that involves transmission of a security credential retrieved following transmission of a single keychain password, authentication token, or machine-linked application role, an execution log showing the single keychain password, authentication token, or machine-linked application role and the security credentials may be automatically generated.

Further, there is some chance that these logs may be viewed by entities outside the enterprise, such as by an enterprise user's customers, by consultants or auditors, or by a government entity, as may occur during government privacy audits, for example. Embodiments described herein ensure that automatically generated execution logs do not show the security credentials and keychain passwords known only to select enterprise employees, such as an Information Security (InfoSec) team member, an individual contributor (IC) level member of technical staff that manages visual data integration processes, or other operations staff, except in encrypted format.

As also described herein, in an embodiment in which the user models the password protected data integration process to include the nested password retrieval, as shown in FIG. 5, a user in possession of a single keychain password, authentication token, or machine-linked application role known only to select enterprise employees, such as InfoSec, IC-Level, or other operations staff may provide all security credentials necessary to complete a password protected data migration process at the time of modeling the visual elements for the same, without having to update the password protected data migration process when any related security credentials stored at the security credential management system are changed. The enterprise user in possession of the keychain password may enter this password within the visual elements modeling the password protected data integration process such that the keychain password entered in such a way may be masked from view upon entry into the visual integration element modeling GUI, for example, by showing the entered characters as asterisks or encrypted characters. This may ensure that any user of the GUI that is not normally in possession of the keychain password does not see the keychain password during modeling of the password retrieval integration process or password protected data integration process.

In an embodiment, a start visual element 502 may operate to begin a process flow, and a stop visual element 524 may operate to end a process flow. Each visual element may require user input in order for a particular enterprise or trading partner to use the resulting process. The start visual element 502 in an embodiment may further allow or require the user to provide data attributes unique to the user's specific integration process, such as, for example, the source of incoming data to be integrated. For example, the user of the visual integration modeling system code instructions or the security credential retrieval system may use a connector visual element to define a connection (e.g., security credentials management system), and the action to be taken (e.g., retrieval of one or more security credentials stored at the security credentials management system). This may happen with a user visually modeling a business data integration process set of code instructions. A user may use a start visual element 502 to further define a location of such data (e.g., a location or pathway at which the security credentials management system may be accessed) and provide necessary credentials to access that location (e.g., single keychain password, authentication token, or machine-linked application role), according to the language and storage structure understood by the application managing such data (e.g., the security credentials management system). The enterprise user in possession of the keychain password may enter this password within the visual elements modeling the password protected data integration process such that the keychain password entered in such a way may be masked from view upon entry into the visual integration element modeling GUI, for example, by showing the entered characters as asterisks or otherwise masked or encrypted. In an embodiment in which the start visual element 502 is found to instruct transmission of the single keychain password, authentication token, or machine-linked application role to the security credentials management system, the GUI user may provide user instructions to require any reporting of the data set field name (e.g., "keychain") or the data set field value (e.g., single keychain password, authentication token, or machine-linked application role specific to the enterprise user) to appear in execution logs in encrypted format, such as in ciphertext.

In an embodiment, dataset field values to be accessed at the start visual element 502 may be identified by a dataset field name given in a format that adheres to the code language and storage structure used by the application/location/enterprise at which such a dataset field value may be accessed. For example, the user may provide the data set field name/value pairs for one or more security credentials to be retrieved from the security credentials management system in a format that adheres to the code language and storage structure used by the security credentials management system.

A map visual element 504, or TransformMap visual element in an embodiment, may associate a first dataset field name for a dataset field value being retrieved from a first application or source with a second dataset field name under which that dataset field value will be stored at a second application or destination. For example, the data set being retrieved from the security credentials management system in an embodiment, as modeled at start visual element 502 may be one or more security credentials for accessing password protected data at password protected data repositories. In such an embodiment, the user may provide the data set field name at which such a security credential may be stored at the security credentials management system, and may use the map visual element 504 to map or associate that data set field name specific to the security credentials management system to another data set field name under which that data set may be stored after it is retrieved from the security credentials management system. Such a retrieved security credential in an embodiment may be stored at the location at which the password retrieval integration process runtime engine is executed (e.g., enterprise 214, enterprise cloud 216 from FIG. 2), or at the service provider server/system or service provider cloud (e.g., 212 or 218 from FIG. 2). The data set field name under which such retrieved security credentials may be stored at such locations pursuant to execution of the modeled password retrieval integration process may adhere to the format required by the storing entity (e.g., by the enterprise system or by the service provider system).

As described herein, the security credentials retrieved during execution of the password retrieval integration process may be stored only temporarily within a user-selected cache in an embodiment in which the security credentials are stored at the service provider server/system. In such a case, the security credentials may be stored only ephemerally, which may decrease any chance of a third-party accessing such a cache or the security credentials stored within. In other cases, the security credentials may be stored at the enterprise user's system during execution of the password retrieval integration process, and may never be accessible by employees at the service provider server/system.

A user of the GUI to generate the visual integration process flow diagram 500 in an embodiment may further provide user input related to the map visual element 504 to allow the user to require any reporting of the data set field name or value for the retrieved one or more security credentials to be shown in encrypted format, such as in ciphertext. This may be done in addition to any encryption, as directed by the user, of the data set field value (e.g., the security credential itself), or any encryption of data sets protected by those security credentials (e.g., password protected data sets retrieved in connection with visual elements 518, 520, and 522). For example, in an embodiment in which the password retrieval integration process directs retrieval of a password "MyP@$$" that is required in order to access password protected data stored at the user's SalesForce® platform, the data set field name may be "SalesForce_pass." In such an embodiment, the user may direct the encryption of the data set field name "SalesForce_pass" using the map visual element 504.

In order for the security credentials retrieval system in an embodiment to perform such an encryption of the security credentials data set field name during execution of the password retrieval integration process, a version of the retrieved security credentials having the unencrypted data set field name (e.g., "SalesForce_pass") may be temporarily stored or cached in memory at the location at which the runtime engine for the password retrieval integration process is executed. The user may also provide user input defining the frequency with which such a cache or temporary storage location may be erased. For example, the user may specify that such a cache may be erased or cleared daily, weekly, or with each execution of the password retrieval integration process.

Because a single set of integration process code instructions may transmit dataset field values between or among several sources and destinations, a process flow may include several of these mapping visual elements 504, sometimes placed in series with one another. This may result in a single dataset field value receiving several different dataset field names as it moves from various sources to various destinations throughout the integration process.

A set properties visual element 506 in an embodiment may allow the user to set one or more properties for the data sets to be retrieved from the security credentials management system. This may be accomplished by allowing the user to associate a user-defined property with a user-defined parameter, similar to a key-value pair definition. For example, a user may use a set properties visual element to set the property "dataset field value" to an encrypted ciphertext string. As described directly above, the map visual element 504 may be used to encrypt a data set field name, which may be distinct from any encryption of the data set field value (e.g., the security credential itself). The user may use the set properties visual element 506 to direct encryption of the data set field value, or the actual security credential or password retrieved from the security credentials management system. For example, in an embodiment in which the password retrieval integration process directs retrieval of a password "MyP@$$" having a data set field name "SalesForce_pass", the user may direct the encryption of the data set field value "MyP@$$" using the set properties visual element 506. Any execution log generated pursuant to execution of the password retrieval integration process may record the retrieved security credentials with these encrypted ciphertext values for either or both the data set field name and data set field value. For example, such an encryption may direct any recordation of such a password in an execution log as a masked value such as "******" or may hash the value to "MyP@$$" to become "533bbdcaa5bc6516fe2617c0077fdf3f73bef7f69fb93cc71 07a79b3fdd93223."

An execution log listing the single keychain password, authentication token, or machine-linked application role or retrieved security credentials in such an encrypted ciphertext format may be generated and supplied to a user of the GUI generating the visual integration process flow diagram 500. In such an embodiment, the execution log reporting transmission of the single keychain password, authentication token, or machine-linked application role or retrieved security credentials may report the single keychain password, authentication token, or machine-linked application role and security credentials in encrypted ciphertext. This may ensure that the execution logs may not disclose the single keychain password, authentication token, or machine-linked application role or any retrieved security credentials to employees within the enterprise not meant to be in possession of such credentials.

A user in an embodiment may then create and customize a "connector" visual component 508 to represent the action of identifying the specific security credentials to be retrieved from the security credentials management system in an embodiment. A connector visual element 508 may operate in a similar manner to the start visual element 502 to define an action to be taken on an identified dataset. For example, the connector visual element 508 in an embodiment may define the storage location at which any retrieved security credentials are stored, either temporarily or in a cache, in encrypted or unencrypted formats. Connector visual elements 508 in an embodiment may differ from start visual elements 502 in that they do not necessarily occur at the beginning of business data integration process code instructions generated from the modeled visual integration process flow diagram 500.

A map visual element 514, or TransformMap visual element in an embodiment, may associate a first dataset field name for a dataset field value being retrieved from a first application or source with a second dataset field name under which that dataset field value will be stored at a second application or destination. The map visual element 514 in an embodiment may map the encrypted data set field name under which the retrieved security credentials were stored pursuant to execution of the password retrieval integration process to a stored copy of the security credentials having an unencrypted data set field name and unencrypted data set field value, in an example.

For example, the map visual element 514 may map the storage location for the encrypted security credentials for accessing the enterprise user's SalesForce account as stored at a known location pursuant to execution of the password retrieval integration process to a location at which an unencrypted version of that data set (e.g., having a data set field name "SalesForce_pass" and a data set field value of "MyP@$$") may be stored. Such an unencrypted copy of the retrieved security credential in an embodiment may be stored at the location at which the password protected data integration process runtime engine is executed (e.g., enterprise 214, enterprise cloud 216 from FIG. 2), or at the service provider server/system or service provider cloud (e.g., 212 or 218 from FIG. 2). The data set field name under which such an unencrypted copy of the retrieved security credentials may be stored at such locations pursuant to execution of the modeled password protected data integration process may adhere to the format required by the storing entity (e.g., by the enterprise system or by the service provider system). For example, such an encryption may direct any recordation of such a password in an execution log as a masked value such as "******" or may hash the value to "MyP@$$" to become "533bbdcaa5bc6516fe2617c0077fdf3f73bef7f69fb93cc710 7a79b3fdd93223." The user may also provide user input defining the frequency with which such a cache or temporary storage location at which such an unencrypted copy of the security credentials may be erased. For example, the user may specify that such a cache may be erased or cleared daily, weekly, or with each execution of the password protected data integration process.

A user of the GUI to generate the modeled visual integration process flow diagram 500 in an embodiment may further provide user input related to the map visual element 514 to allow the user to require any reporting of the data set field name or value for the unencrypted copy of the security credentials to be shown in encrypted format, such as in ciphertext. This may be done in addition to any encryption of data sets protected by those security credentials (e.g., password protected data sets retrieved during a password protected data integration process such as that described in greater detail with respect to set properties visual element 520). For example, in an embodiment in which the password retrieval integration process directs storage of a decrypted version of a password "MyP@$$" that is required in order to access password protected data stored at the user's SalesForce® platform, the data set field name may be "SalesForce_pass." In such an embodiment, the user may direct the encryption of any reporting of the data set field name "SalesForce_pass" using the map visual element 514.

A user in an embodiment may then create and customize a "connector" visual element component 516 to represent the action of identifying the specific security credentials to be transmitted to the password protected data repository. For example, the connector visual element 516 in an embodiment may define the storage location at which any unencrypted retrieved security credentials are stored, and an address or pathway for the password protected data repository to which such passwords will be transmitted.

An execution log listing the transmitted security credentials in such an encrypted ciphertext format may be generated. In such an embodiment, the execution log reporting transmission of the security credentials may only be viewed by users in encrypted ciphertext. In such a way, the user may model additional steps of changing the data set field name or value for the supplied single keychain password, authentication token, or machine-linked application role or retrieved security credentials to appear within any later generated execution log as encrypted ciphertext. This may ensure that the execution logs may not disclose the single keychain password, authentication token, or machine-linked application role or any retrieved security credentials to employees within the enterprise or others not meant to be in possession of such credentials.

The map visual element 518 in such an embodiment may map the storage location for the customer's contact information within the SalesForce account to a location within the NetSuite® platform where such information may be stored. The data set field name under which such customer contact may be stored at such locations pursuant to execution of the modeled password protected data integration process may adhere to the format required by the storing entity (e.g., by the NetSuite® platform). A user of the GUI generating the modeled visual integration process flow diagram 500 in an embodiment may further provide user input related to the map visual element 518 to allow the user to require any reporting of the data set field name or value for the customer address to be shown in encrypted format, such as in ciphertext. This may be done in addition to any encryption of security credentials supplied in order to access such password protected customer addresses.

A set properties visual element 520 in an embodiment may allow the user to set one or more properties for the data sets to be retrieved from the security credentials management system. This may be accomplished by allowing the user to associate a user-defined property with a user-defined parameter, similar to a key-value pair definition. For example, a user may use a set properties visual element to set the property "dataset field value" to an encrypted ciphertext string. The user may use the set properties visual element 520 to direct encryption of the data set field value, or the customer address of "123_Main_St." Any execution log generated pursuant to execution of the password protected data integration process modeled within GUI to generate the modeled visual integration process flow diagram 500 may record the migrated password protected data sets (e.g., customer addresses) with these encrypted ciphertext values for either or both the data set field name and data set field value.

A user in an embodiment may then create and customize a "connector" visual element component 522 to represent the action of identifying the specific password protected data set (e.g., customer contact) to be retrieved from the password protected data repository (e.g., SalesForce® platform) and migrated to the destination data repository (e.g., NetSuite® platform) in an embodiment. The stop visual element 524 in an embodiment may operate to terminate the business data integration process code instructions.

The integration application management system in an embodiment may associate each of the visual elements within the integration process-modeling graphical user interface of the visual integration modeling system code instructions with a set of code instructions written in a machine-readable, executable format for each process element code set in the modeled visual integration process flow diagram 500. For example, the integration application management system in an embodiment may associate the start visual element 502 with a connector code set, written or generated in a human-readable, machine-executable code language (e.g., JSON or XML), that includes code instructions for accessing a dataset field value associated with a user-specified dataset field name defined within the start visual element 502. Upon generation and storage within a memory of each of the code sets associated with each of the visual elements 502, 504, 506, 508, 514, 516, 518, 520, 522, or 524 within the visual integration process flow diagram 500 of the integration process-modeling graphical user interface in an embodiment, the integration application management system may further generate a runtime engine capable of executing each of these code sets. The integration application management system in an embodiment may transmit the runtime engine and each of the code sets for execution of the business data integration process code instructions visually modeled by the user or auto-generated via the integration process-modeling graphical user interface of the visual integration modeling system code instructions for execution of the integration process code instructions at a remote location (e.g., behind the firewall of a user's enterprise system/network).

These code sets in an embodiment may be written or generated in any programming code language, so long as the code language in which the property is defined matches the code language in which the parameter is also defined. Similarly, the code sets associated with the connection location and action to be taken within a connector visual element may be written or generated in any programming code language so long as they are consistent with one another. Thus, the process-representing visual elements in an embodiment may be programming language-agnostic. Using such process-representing elements in an embodiment, a user may visually model end-to-end integration process code instructions between multiple applications that each use different naming conventions and storage structures for storage of dataset field values via the visual integration modeling system code instructions of embodiments herein. The integration application management system operating at least partially at a system provider server/system in an embodiment may generate a dynamic runtime engine for executing these pre-defined subsets of code instructions correlated to each individual process-representing visual element (process component) 502, 504, 506, 508, 514, 516, 518, 520, 522, or 524 in a given integration process flow diagram visual model 500 in the order in which they are visually modeled in the given integration process flow diagram visual model 500. Further, the user may provide additional visual elements to instruct access and migration of password protected data sets from a plurality of different password protected data repositories using a plurality of retrieved security credentials, with each of the plurality of security credentials allowing access to one of the plurality of password protected data repositories.

Figure 6:
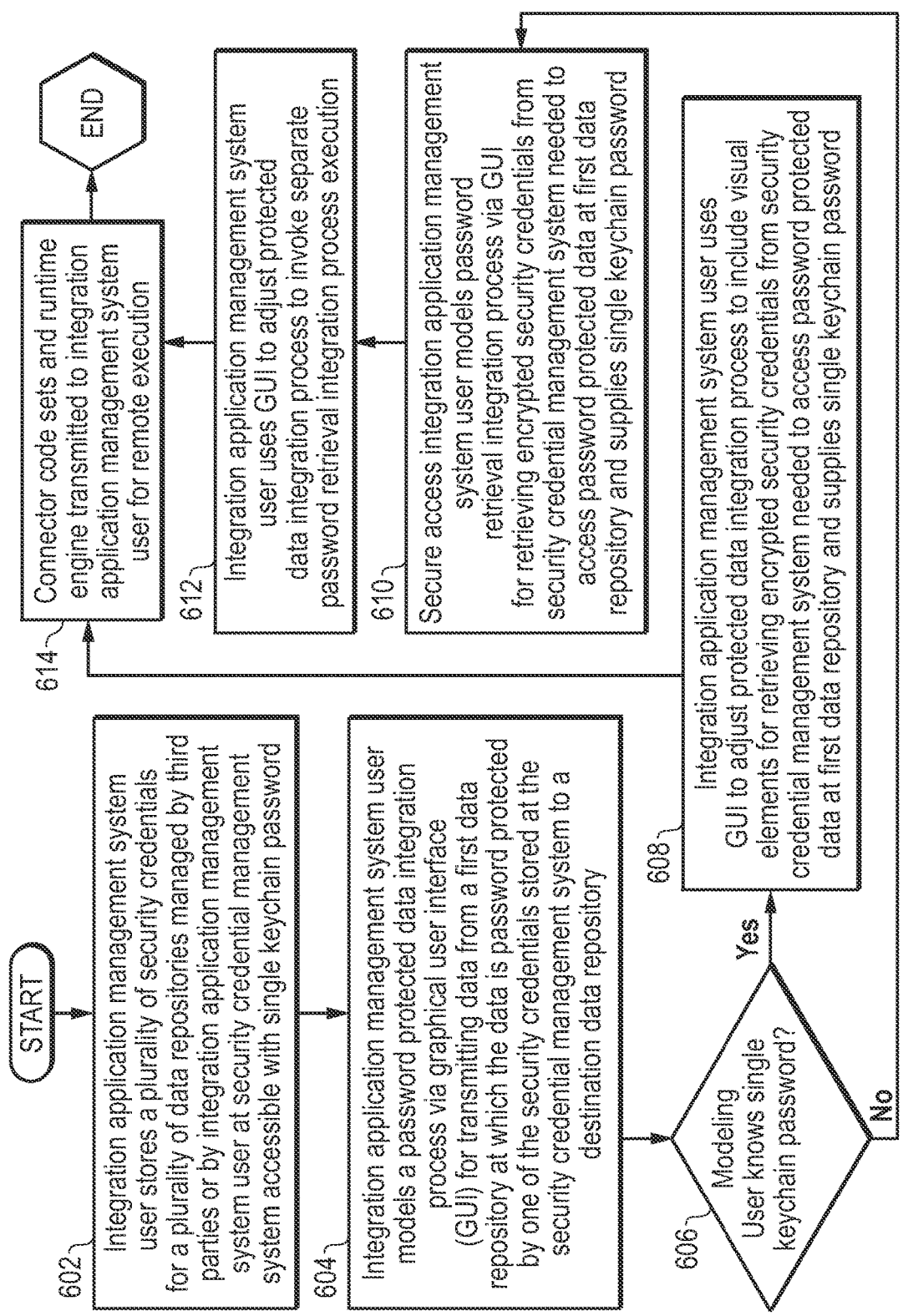
FIG. 6 is a flow diagram illustrating a method of generating code instructions for a password protected data integration process and a password retrieval integration process based on visual elements used in a visual integration modeling system according to an embodiment of the present disclosure.

FIG. 6 is a flow diagram illustrating a method of generating code instructions for a password protected data integration process and a password retrieval integration process based on visual elements customized by a user via one or more graphical user interfaces (GUIs) to represent integration flow steps according to an embodiment of the present disclosure. As described herein, the security credential retrieval system in an embodiment allows a user of the security credentials retrieval system and integration application management system to visually model a password retrieval integration process either as an individual visual integration process flow diagram, or within the visual integration process flow diagram for a password protected data integration process that uses such retrieved passwords or security credentials. The user may provide the single keychain password, authentication token, or machine-linked application role required to access the security credentials manager within such a flow of visual elements representing steps of retrieving security credentials needed to access the password protected data sets to be migrated as part of the password protected data integration process.

At block 602, an integration application management system user may store a plurality of security credentials for a plurality of data repositories managed by a third party or by an integration application management system user at a security credential management system accessible with a single keychain password, authentication token, or machine-linked application role. For example, in an embodiment described with respect to FIG. 2, enterprise users routinely store sensitive information within a plurality of cloud-based or enterprise managed platforms (e.g., 214 or 216), each often requiring separate passwords, or recommending use of different passwords. In order to keep track of the growing volume of passwords required by enterprise users, many have begun using secrets managers or security credential management systems (e.g., 210) such as HashiCorp® Vault, LastPass®, or 1Password®. Such security credential management systems (e.g., 210) allow enterprise users to supply a single keychain password, authentication token, or machine-linked application role, usually known to only select enterprise employees, such as an Information Security (InfoSec) team member, an individual contributor (IC) level member of technical staff that manages visual data integration processes, or other operations staff, to access all of the passwords or security credentials necessary to access the enterprise's many password protected data repositories within 214 or 216 (e.g., SalesForce®, Netsuite®, etc.).

The integration application management system user in an embodiment at block 604 may model a password protected data integration process via a graphical user interface (GUI) for transmitting data from a first data repository at which the data is password protected by one of the security credentials stored at the security credential management system to a destination data repository. For example, as described in an embodiment with reference to FIG. 4, a user of the GUI 281 may model a visual integration process flow 400 for a password protected data integration process using visual elements 412, 414, 416, 418, 420, 422, and 424. As another example, as described in an embodiment with reference to FIG. 5, a user may use a GUI 281 to model a visual integration process flow diagram 500 for a password protected data integration process using visual elements 514, 516, 518, 520, 522, and 524.

At block 606, it may be determined whether the user performing the modeling of the password protected data integration process is in possession of the single keychain password, authentication token, or machine-linked application role needed to access security credentials stored at the security credentials management system in an embodiment. As described herein, because a single keychain password, authentication token, or machine-linked application role may only be known to certain select enterprise users, such as InfoSec, IC-Level, or other operations staff of the integration application management system, the enterprise user who may be in possession of such information may not be the same user that models the password protected data integration process for migrating password protected data sets from the password protected data repository (e.g., at 214 or 216) to the destination data repository (e.g., 208, or within another location in 214 or 216). For example, the single keychain password, authentication token, or machine-linked application role may be known to select enterprise users, while a non-management information technology (IT) professional who does not know the single keychain password, authentication token, or machine-linked application role may model the password protected data integration process. In such an embodiment, the user in possession of the single keychain password, authentication token, or machine-linked application role may model the integration process for supplying that keychain password to retrieve security credentials separately from the integration process that supplies those retrieved security credentials in order to access password protected data. This second step, in which the password protected data is retrieved using the security credentials may be modeled separately by an enterprise user not in possession of the keychain password(s). In other embodiments, the enterprise user in possession of the single keychain password, authentication token, or machine-linked application role used to access the security credential management system 210 may also be the same user modeling the password protected data integration process. In such embodiments, such a user may provide the single keychain password, authentication token, or machine-linked application role and model the password protected data integration process via the GUI 281 as a single integration process, as described in greater detail above with respect to FIG. 5.

If the user modeling the password protected data integration process is in possession of the single keychain password, authentication token, or machine-linked application role, the method may proceed to block 608 for adjusting the modeled password protected data integration process to include retrieval of the security credentials from the security credentials management system using the single keychain password, authentication token, or machine-linked application role. If the user modeling the password protected data integration process is not in possession of the single keychain password, authentication token, or machine-linked application role, it may be necessary or easier for the user who is in possession of the keychain password to model a separate password retrieval integration process for retrieving the security credentials from the security credentials management system. The method in such a case may proceed to block 610 for modeling of the password retrieval integration process by another user who is in possession of the single keychain password, authentication token, or machine-linked application role.

At block 608, in an embodiment in which the user modeling the password protected data integration process is in possession of the single keychain password, authentication token, or machine-linked application role, that user may adjust the password protected data integration process in the visual integration process flow diagram to include visual elements for retrieving the security credentials from the security credentials management system. When a user is generating the visual integration process flow diagram, the password protected data integration process may invoke the password retrieval as nested within the password protected data integration process formed by the user and the embodiments herein may protect the keychain password and any other security credentials, secured data, descriptions of the secure data and the like. For example, in an embodiment described with reference to FIG. 5, the user in possession of the single keychain password, authentication token, or machine-linked application role may adjust the password protected data integration process in the visual integration process flow diagram 500 to include visual elements 502, 504, 506, and 508, for retrieval of the security credentials from the security credentials manager that are required for accessing the data sets to be migrated according to the visual elements 514, 516, 518, 520, 522, and 524. The method may then proceed to block 614 for generation of connector code sets associated with the modeled visual elements of the password protected data integration process and a runtime engine for execution of such connector code sets at a remote location.

In an embodiment in which the user modeling the password protected data integration process is not in possession of the single keychain password, authentication token, or machine-linked application role, another user who is in possession of this information may model a password retrieval integration process with another visual integration process flow diagram. For example, the user in an embodiment described with respect to FIG. 3 may model a separate password retrieval integration process with another visual integration process flow diagram 300 via visual elements 302, 304, 306, 308, and 310.

At block 612, the first or second integration application management system user (e.g., either the user who is in possession of the single keychain password, authentication token, or machine-linked application role, or the user who is not) in an embodiment may adjust the password protected data integration process in the visual integration process flow diagram via a GUI 281 to invoke the separate password retrieval integration process. In an embodiment, the password protected data integration process execution may be formed to retrieve the security credentials stored as a result of an earlier or parallel execution of the separate password retrieval integration process. For example, a user with visual integration process flow diagram 400 described with respect to FIG. 4 above may adjust the visual element 412, to retrieve the security credentials stored or cached as a result of an earlier or parallel execution of the separate password retrieval integration process modeled at the visual integration process flow diagram 300 of FIG. 3 above and as described at block 610. More specifically, a user may use the start visual element 412 to access and then provide security credentials previously retrieved from the security credentials management system pursuant to the separate password retrieval integration process of FIG. 3 and from block 610, according to the language and storage structure understood by the application managing such data (e.g., the password protected data repository). The method may then proceed to block 614 for generation of connector code sets associated with the modeled visual elements of the password protected data integration process, and potentially a separate connector code set for the password retrieval integration process as well as generation of plural runtime engines for execution of such connector code sets at a remote location.

The integration application management platform and the secure credentials retrieval system in an embodiment at block 614 may generate connector code sets associated with the modeled visual elements of the password protected data integration process or the separate password retrieval integration process, and generate a runtime engine for execution of such connector code sets at a remote location. The integration application management system in an embodiment may associate each of the visual elements within a visual integration process flow diagram generated in the integration process-modeling graphical user interface of the visual integration modeling system code instructions with a set of code instructions written in a machine-readable, executable format for each process element code set. For example, in an embodiment described with respect to FIG. 3, the integration application management system in an embodiment may associate the start visual element 302 of the visual integration process flow diagram 300 with a connector code set, written or generated in a human-readable, machine-executable code language (e.g., JSON or XML), that includes code instructions for accessing a dataset field value associated with a user-specified dataset field name defined within the start visual element 302. Upon generation and storage within a memory of each of the code sets associated with each of the visual elements 302, 304, 306, 308, or 310 within the visual integration process flow diagram 300 of integration process-modeling graphical user interface in an embodiment, the integration application management system may further generate a runtime engine capable of executing each of these code sets such as for the separate password retrieval integration process. With embodiments of the present disclosure, any secure keychain password accessed with the password retrieval integration process of FIG. 3 via the security credential management system or any other passwords or security access data may be protected or shielded in the integration process visual flow diagram 300 and via any execution logs according to various embodiments described herein.

As another example, in an embodiment described with respect to FIG. 4, the integration application management system in an embodiment may generate and store within a memory of each of the code sets associated with each of the visual elements 412, 414, 416, 418, 420, 422, or 424 within the visual integration process flow diagram 400 of the integration process-modeling graphical user interface, and generate a runtime engine capable of executing each of these code sets. In still another example, in an embodiment described with respect to FIG. 5, the integration application management system in an embodiment may generate and store within a memory of each of the code sets associated with each of the visual elements 502, 504, 506, 508, 512, 514, 516, 518, 520, 522, or 524 within the visual integration process flow diagram 500 of the integration process-modeling graphical user interface, and generate a runtime engine capable of executing each of these code sets for a password protected data integration process with nested password or security credential retrieval. In such a way, a user may visually model end-to-end integration process code instructions between multiple applications that each use different naming conventions and storage structures for storage of dataset field values via the visual integration modeling system code instructions of embodiments herein. The method for generating code instructions for a password protected data integration process and a password retrieval integration process may then end.

Figure 7:
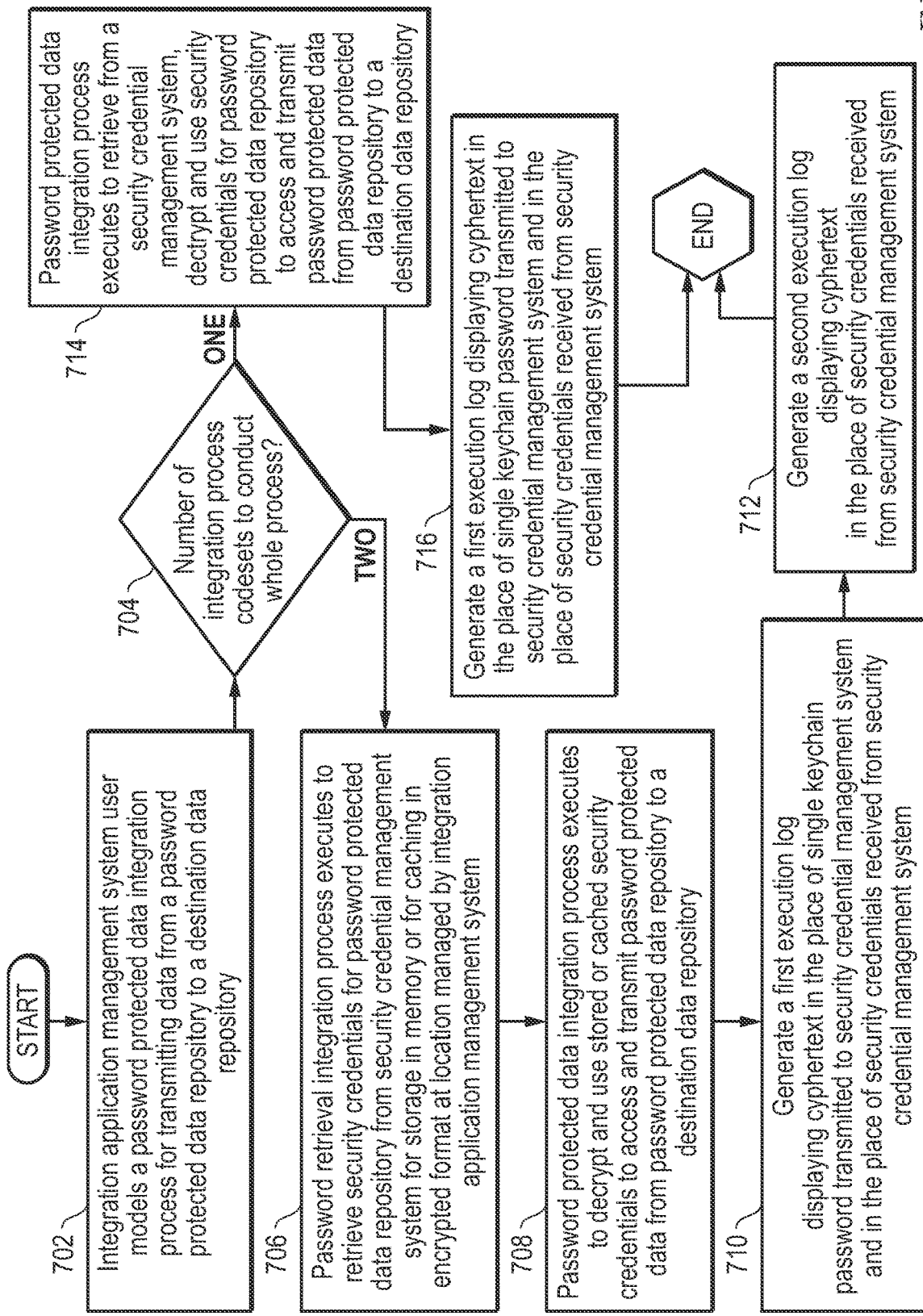
FIG. 7 is a flow diagram illustrating a method of executing code instructions for a password protected data integration process and a password retrieval integration process generated based on visual elements used in a visual integration modeling system according to an embodiment of the present disclosure.

FIG. 7 is a flow diagram illustrating a method of executing code instructions for a password protected data integration process and a password retrieval integration process based on visual elements customized by a user via one or more graphical user interfaces (GUIs) to represent integration flow steps or a nested password retrieval within a password protected data integration process according to embodiments of the present disclosure. As described herein, embodiments of the present disclosure allow a user in possession of a single keychain password, authentication token, or machine-linked application role known only to select enterprise employees, such as InfoSec, IC-Level, or other operations staff to provide all security credentials necessary to complete a password protected data migration process at the time of modeling the visual elements, without having to update the password protected data migration process when any of the related security credentials stored at the security credential management system are changed. The security credential retrieval system allows users to model a password retrieval integration process either as either a separate individual flow chart, or have password retrieval nested within the flow chart for a password protected data integration process that uses such retrieved passwords or security credentials. In both of these cases, the enterprise user in possession of the keychain password may enter this password within the visual elements modeling the password retrieval integration process (either as a separate individual process or as nested within the password protected data integration process). The keychain password may be used with a remote security credential management system to obtain passwords or security credentials to access source or destination databases with password protection for data access. The keychain password entered in such a way under either embodiment may be masked from view upon entry into the visual integration element modeling GUI, for example, by showing the entered characters as asterisks or with otherwise shielded or encrypted characters. This may ensure that any user not normally in possession of the keychain password does not see the keychain password during modeling of the password retrieval integration process (either as a separate individual process or as nested within the password protected data integration process) or via any modeling of the password protected data integration process. Further, by avoidance of long term storage of any security credentials retrieved using the keychain password at any third-party locations, such as the Boomi® platform or other service providers provides added security for the security credentials.

In one embodiment, modeling the password retrieval integration process separately from the password protected data integration process may separate the involvement and access to the individual passwords and security authentication aspects away from a user not normally in possession of the keychain password or related security credentials or any third parties. An enterprise user who is in possession of a single keychain password, authentication token, or machine-linked application role used to access several sensitive security credentials may enter that single keychain password, authentication token, or machine-linked application role in a separate password retrieval integration process to retrieve these security credentials via security credential management system in some embodiments. This separate password retrieval process may then be accessed or called upon by a password protected data integration process that must access, transform, and transfer data from password protected databases or to password protected databases in example embodiments. Another, user who is not in possession of the single keychain password, authentication token, or machine-linked application role in such an embodiment may be tasked with modeling the integration process flow for retrieving password protected data using the security credentials retrieved using the keychain password from the separate password retrieval integration process. In many cases, the integration process flow for retrieving, transforming, and transferring password protected data may be a more involved and complicated integration process visual modeling process. Such a second user who does not normally have access to the keychain password or related security credentials, such as a consultant at an integration modeling management service, may model the password protected data integration process, and may model that process to invoke the separately modeled password retrieval integration process modeled by the user with access to the single keychain password, authentication token, or machine-linked application role. In such a way, the second user may model an integration process for accessing password protected data without having access to the security credentials necessary to access that password protected data or the single keychain password, authentication token, or machine-linked application role. In fact, the second user may not even be aware of the location (e.g., secure credential management platform) or method by which the security credentials have been retrieved. This may provide added security for the single keychain password, authentication token, or machine-linked application role. In addition, any changes made to the single keychain password, authentication token, or machine-linked application role may be addressed by the first, user adjusting the password retrieval integration process modeled without any need for the second user to adjust the password protected data integration process.

In another aspect of embodiments described herein, users may mask or obscure any disclosure of security credentials or keychain passwords used in such an execution within automatically generated execution logs. Execution of these integration processes results in generation of an execution log that lists each of the data sets so migrated, including the security credentials or keychain passwords provided by the user. Such execution logs may be generated automatically in embodiments herein in order to demonstrate compliance with customer instructions, government data privacy regulations, or for tracking errors made during data integration process execution. These execution logs may list each of the datasets migrated during execution of a given integration process. For example, in an integration process that involves transmission of a keychain password and receipt of a security credential at an enterprise user, an execution log showing the keychain password and the retrieved security credential may be automatically generated. Further, there is some chance that these logs may be viewed by entities outside the enterprise, such as by an enterprise user's customers or by a government entity, as may occur during government privacy audits, for example. Embodiments described herein limits automatically generated execution logs to show the single keychain password, authentication token, or machine-linked application role known only to select enterprise employees, such as InfoSec, IC-Level or other operations staff only in encrypted format, and in some cases, disallows access to execution logs displaying the single keychain password, authentication token, or machine-linked application role in encrypted format by Boomi® enterprise users or employees who would not normally be in possession of such a single keychain password, authentication token, or machine-linked application role. Further, the keychain password and security credentials migrated during execution will appear as encrypted ciphertext in any execution logs in the embodiments herein. In such a way, the security credential retrieval system may ensure that the execution logs may not disclose the single keychain password, authentication token, or machine-linked application role or any retrieved security credentials to employees within the enterprise or others not meant to be in possession of such credentials.

At block 702, a processor executing code instructions of an integration application management system user may visually model a password protected data integration process in a visual integration process flow diagram for transmitting data from a password protected data repository to a destination data repository. For example, the user of a GUI in a first embodiment described above with respect to FIG. 6 may visually model a password protected data integration process for using security credentials retrieved from a security credential management system pursuant to execution of code instructions for a separate password retrieval integration process to access password protected data sets from a password protected data repository, and migrating those password protected data sets from the password protected data repository to a destination data repository. As another example, the user in a second embodiment described above with respect to FIG. 6 may visually model a password protected data integration process within a single integration process that further includes nested steps for retrieving security credentials from a security credential management system, in addition to using those retrieved security credentials to access password protected data sets from a password protected data repository, and migrating those password protected data sets from the password protected data repository to a destination data repository. In other words, when a single, nested integration process is used to both retrieve any necessary passwords from the password protected data repository and used those retrieved passwords from a remotely secure security credential management system accessed for those passwords to integration password protected data sets, this single integration process may be visually modeled using an integration application management system GUI by a user with secure access. However, this process may also be separated into a first password retrieval integration process for retrieving necessary passwords from a secure access user and a second password protected data integration process form a general user for retrieving from a remotely secure security credential management system and using those retrieved passwords to access password protected data at a password protected data repository. In such a case, the first password retrieval integration process may be visually modeled via a integration application management system GUI by a first secure access user, and the second password protected data integration process may be visually modeled via a integration application management system GUI by a separate employee or administrator who specializes in data integration, but does not possess high level security access.

It may be determined at block 704 whether the integration processes described directly above and with respect to FIG. 6 have been modeled within a single model flow or in separate modeled flows. For example, the user of a GUI in an embodiment described with respect to FIG. 5 and with respect to block 608 of FIG. 6 may model a single password protected data integration process that includes the nested steps of retrieving security credentials from a security credential management system. As another example, the steps of retrieving security credentials from a security credential management system may be modeled with a GUI in a separate flow model for a separate password retrieval integration process than the steps modeled with a GUI for using those retrieved security credentials to access password protected data sets from a password protected data repository, and migrating those password protected data sets from the password protected data repository to a destination data repository. More specifically, the user of a GUI in an embodiment described with respect to FIG. 3 and at block 610 of FIG. 6 may model a password retrieval integration system for retrieving security credentials from a security credential management system. Additionally, the user of a GUI in an embodiment described with respect to FIG. 4 and at block 612 of FIG. 6 may model a password protected data integration process for using those retrieved security credentials (by retrieving the data sets retrieved as part of the separate password retrieval integration process at the location at which the modeled password retrieval integration process directed them to be stored) to access password protected data sets from a password protected data repository, and migrating those password protected data sets from the password protected data repository to a destination data repository. If the user models more than one flow for an integration process, the method may proceed to block 706 for execution of the password retrieval integration process, prior to execution of the password protected data integration process. If the user models a single flow that includes nested retrieval of the security credentials from a security credentials manager, the method may proceed to block 714 for execution of this single integration process.

At block 706, in an embodiment in which the user has modeled a separate password retrieval integration process, the password retrieval integration process may execute to retrieve security credentials for password protected data repositories from a security credential management system. For example, in an embodiment described with respect to FIG. 3, the hardware processor at the service provider server/system may execute code instructions of the security credentials retrieval system or the integration application management system to generate code instructions for performing the steps illustrated by the visual elements 302, 304, 306, 308, and 310 of the visual integration process flow diagram 300 to retrieve security credentials for password protected data repositories from a security credential management system. More specifically, these visual elements may model an integration process for retrieving a security credential data set having a data set field name "SalesForce_pass," and a data set field value of "MyP@$$." As also described with respect to FIG. 3, the integration application management system may generate a runtime engine for execution of these code instructions at a remote location, such as within the enterprise system, within the enterprise cloud, or within the system provider cloud. These code instructions, when executed via the runtime engine in an embodiment may cause retrieval of the security credentials and storage of these security credentials in a secure memory at the location at which the runtime engine is executed, which may be located behind a firewall of the enterprise. In another embodiment, these code instructions, when executed via the runtime engine may cause retrieval of the security credentials and caching of these security credentials at the location at which the runtime engine is executed, or at a location managed by the integration application management system. The user may set the frequency of cache clearing in some cases at the integration application management system in order to ensure that the security credentials cached are erased sufficiently frequently to decrease risk of unsecure access to those security credentials by enterprise users or administrators for the integration application management system.

The first user who is in possession of the keychain password(s) may provide the single keychain password, authentication token, or machine-linked application role required to access the security credentials manager within a visual integration process flow diagram of visual elements representing steps of retrieving security credentials needed to access the password protected data sets in a separately-modeled and executed password retrieval integration process. The password retrieval integration process in embodiments may use these security credentials to access and migrate those password protected data sets. The code instructions for the password protected data integration process modeled using these visual elements may then execute to access the security credentials management system via the separate password retrieval integration process, retrieve any security credentials for involved password protected data repositories, and perform the modeled migration of password protected data sets from these password protected data repositories to the destination data repository.

In another aspect of embodiments described herein, users may mask or obscure any disclosure of security credentials or keychain passwords used in such an execution within automatically generated execution logs. Execution of these integration processes results in generation of an execution log that lists each of the data sets so migrated, including the security credentials or keychain passwords provided by the user. Such execution logs may be generated automatically in embodiments herein in order to demonstrate compliance with customer instructions, government data privacy regulations, or for tracking errors made during data integration process execution. These execution logs may list each of the datasets migrated during execution of a given integration process. For example, in a separate password retrieval integration process as in block 706 that involves transmission of a keychain password and receipt of a security credential at an enterprise user, an execution log showing the keychain password and the retrieved security credential may be automatically generated. Further, there is some chance that these logs may be viewed by entities outside the enterprise, such as by an enterprise user's customers or by a government entity, as may occur during government privacy audits, for example. Embodiments described herein ensure that automatically generated execution logs show the single keychain password, authentication token, or machine-linked application role known only to select enterprise users such as InfoSec, IC-Level, or other operations staff only in encrypted format.

Thus, according to embodiments described herein, the GUI used to model the visual integration process flow diagram 300 in an embodiment may allow the user to require any reporting within an execution log of the data set field name or value for the retrieved one or more security credentials to be shown in encrypted format, such as in ciphertext. In order for the security credentials retrieval system in an embodiment to perform such an encryption of the security credentials data set field name during execution of the password retrieval integration process, a version of the retrieved security credentials having the unencrypted data set field name (e.g., "SalesForce_pass") may be temporarily stored or cached in memory at the location at which the runtime engine for the password retrieval integration process is executed, which may be behind an enterprise firewall, at a cloud server, or at a service provider server/system in various embodiments. In another example aspect of an embodiment, a user may use a set properties visual element 306 to set the property "dataset field value" to an encrypted ciphertext string for storage at the location where the runtime engine is executed. As described directly above, the map visual element 304 may be used to encrypt a data set field name, which may be distinct from any encryption of the data set field value (e.g., the security credential itself). The user may use the set properties visual element 306 to direct encryption of the data set field value for storage at the same location where the runtime engine is executed, or the actual security credential or password retrieved from the security credentials management system. For example, in an embodiment in which the password retrieval integration process directs retrieval of a password "MyP@$$" having a data set field name "SalesForce_pass", the user may direct the encryption of the data set field value "MyP@$$" using the set properties visual element 306. For example, such an encryption may direct any recordation of such a password in an execution log as a masked value such as "******" or may hash the value to "MyP@$$" to become "533bbdcaa5bc6516fe2617c0077fdf3f73bef7f69fb93cc710 7a79b3fdd93223."

At block 708 in an embodiment, the password protected data integration process may execute to decrypt and use the stored or cached security credentials to access and transmit password protected data from a password protected data repository to a destination data repository. These security credentials in some embodiments may have been retrieved pursuant to a separately modeled password retrieval integration process, such as that described with respect to FIG. 3 and block 706 above. In such an embodiment, code instructions for the password protected data integration process modeled via visual elements within the visual integration process flow diagram 400 in an embodiment described with respect to FIG. 4 may execute to access and transmit the security credentials retrieved from the security credentials manager, as described above at block 706.

In various embodiments herein, execution of the password protected data integration process may include two primary steps: (1) transmission of security credentials to a password protected data repository; and (2) migration of one or more password protected data sets from that password protected data repository to a destination data repository. The map visual element 414 and the connector visual element 416 may model the first step of this process, to instruct transmission of security credentials to a password protected data repository.

As described above with respect to block 706, execution of the password retrieval integration process may result in accessing the security credentials management system, and retrieving any security credentials for password protected data repositories to be accessed during later execution of a password protected data integration process. These security credentials may be stored under an encrypted data set field name or have an encrypted data set field value. The data set field name or data set field value may require decryption prior to transmission to the password protected data repository in an embodiment, in order for the password protected data repository to accept the security credentials as correct. For example, the encrypted security credentials for accessing the enterprise user's SalesForce account may be stored in an unencrypted copy having a data set field name "SalesForce_pass" and a data set field value of "MyP@$$" at a location at which the password protected data integration process runtime engine is executed (e.g., enterprise 214, enterprise cloud 216 from FIG. 2), or at the service provider server/system or service provider cloud (e.g., 212 or 218 from FIG. 2). This unencrypted copy of the security credentials may then be transmitted to the password protected data repository (e.g., SalesForce® platform) where one or more password protected data sets are stored without access or view by an enterprise user or others without authorization to see such passwords or other security credentials. Following transmission of the necessary security credentials to the password protected data repository in such a way, the password protected data integration process may further execute to migrate one or more password protected data sets (e.g., customer addresses) from the password protected data repository (e.g., SalesForce® platform) for storage at a destination data repository (e.g., NetSuite® platform).

A first execution log in an embodiment may be generated at block 710, showing ciphertext in the place of a single keychain password, authentication token, or machine-linked application role transmitted to the security credential management system and in the place of security credentials received from a security credential management system. As described herein, execution of the password retrieval integration process and the password protected data integration process results in automatic generation of execution logs that list each of the data sets migrated, including the security credentials or keychain passwords provided by the user. In the case where these two integration processes are modeled in separate flow charts, as described with respect to blocks 706 and 708, separate execution logs may be generated for each of these integration processes to show all data sets migrated during execution of these processes. Such execution logs may be generated automatically in embodiments in order to demonstrate compliance with customer instructions, government data privacy regulations, or for tracking errors made during data integration process execution. These execution logs may list each of the datasets migrated during execution of a given integration process. For example, in the password retrieval integration process that involves transmission of a keychain password and receipt of a security credential at an enterprise user, a first execution log showing the keychain password and the retrieved security credential may be automatically generated. As another example, in the password protected data integration process that involves transmission of the retrieved security credentials to a remote password protected data repository for accessing and migration of password protected data sets, a second execution log showing the transmitted security credentials may be automatically generated. Further, there is some chance that these logs may be viewed by entities outside the enterprise, such as by an enterprise user's customers or by a government entity, as may occur during government privacy audits, for example. Embodiments of the present disclosure ensure that automatically generated execution logs show the single keychain password, authentication token, or machine-linked application role known only to select enterprise users, such as InfoSec, IC-Level, or other operations staff only in encrypted format.

For example, the user in possession of the single keychain password, authentication token, or machine-linked application role may model additional steps of changing the data set field name or value for the supplied single keychain password, authentication token, or machine-linked application role or retrieved security credentials to appear as encrypted ciphertext in execution logs automatically generated upon each execution of the password retrieval integration process, in an embodiment which the user in possession of the single keychain password, authentication token, or machine-linked application role models the password retrieval integration process separately from the password protected data integration process, in order to further ensure security of the single keychain password, authentication token, or machine-linked application role. In such a way, the security credential retrieval system may ensure that the execution logs may not disclose the single keychain password, authentication token, or machine-linked application role or any retrieved security credentials to employees within the enterprise or others not meant to be in possession of such credentials.

For example, in an embodiment described with reference to FIG. 3, the GUI in an embodiment may allow the user to require any reporting of the data set field name or value for the single keychain password, authentication token, or machine-linked application role or the retrieved one or more security credentials to be shown in encrypted format, such as in ciphertext. In such a way, the user may model additional steps of changing the data set field name or value for the supplied single keychain password, authentication token, or machine-linked application role or retrieved security credentials to appear within any later generated execution log as encrypted ciphertext. This may ensure that the execution logs may not disclose the single keychain password, authentication token, or machine-linked application role or any retrieved security credentials to employees within the enterprise not meant to be in possession of such credentials.

At block 712, a second execution log may be generated, displaying ciphertext in the place of security credentials received from the security credential management system. For example, in an embodiment described with respect to FIG. 4, an execution log listing the transmitted security credentials in an encrypted ciphertext format may be viewable by not normally in possession of the keychain password or related security credentials. In such an embodiment, the execution log reporting transmission of the security credentials may only display such security credentials in encrypted ciphertext. The execution log for the password protected data integration process modeled in an embodiment described with respect to FIG. 4 may not include any mention of the single keychain password, authentication token, or machine-linked application role in encrypted or unencrypted format, as it was only shared with the security credential management system within the separately executed password retrieval integration process modeled at FIG. 3. However, execution logs of the separately executed password retrieval integration process modeled at FIG. 3 may also mask the security credentials or any keychain password in ciphertext as well in case auditors or others must review it. In such a way, the user may model additional steps of changing the data set field name or value for the supplied single keychain password, authentication token, or machine-linked application role or retrieved security credentials to appear within any later generated execution log as encrypted ciphertext. This may ensure that the execution logs may not disclose the single keychain password, authentication token, or machine-linked application role or any retrieved security credentials to employees within the enterprise not meant to be in possession of such credentials. The method for executing code instructions for a password protected data integration process modeled in two separate flow charts may then end.

Returning to block 704, where the password protected data integration process is modeled to include nested password retrieval within one password protected data integration process that includes the steps of retrieving the security credentials from the security credential management system in an embodiment flow may proceed to block 714 At block 714, the password protected data integration process may include nested password retrieval and execute to retrieve the security credentials for the password protected data repository from the security credential management system and temporarily store in an encrypted format at a user-managed location. For example, the password protected data integration process modeled at FIG. 5 by a user in an embodiment may execute code instructions generated based on the visual elements 502, 504, 506, and 508. This may include the steps of defining a location or pathway at which the security credentials management system may be accessed, providing necessary credentials to access that location, providing the data set field name at which such a security credential may be stored at the security credentials management system, associating that data set field name specific to the security credentials management system to another data set field name under which that data set may be stored, and defining that storage location. Such a retrieved security credential in an embodiment may be stored at the location at which the password retrieval integration process runtime engine is executed (e.g., enterprise 214, enterprise cloud 216 from FIG. 2), or at the service provider server/system or service provider cloud (e.g., 212 or 218 from FIG. 2).

Execution of the code instructions reflecting visual element 504 in an embodiment may ensure any reporting of the data set field name or value for the retrieved one or more security credentials to be shown in encrypted format, such as in ciphertext. This may be done in addition to any encryption, as directed by the user, of the data set field value (e.g., the security credential itself), or any encryption of data sets protected by those security credentials (e.g., password protected data sets retrieved in connection with visual elements 518, 520, and 522). For example, in an embodiment in which the password retrieval nested within the password protected data integration process directs retrieval of a password "MyP@$$" that is required in order to access password protected data stored at the user's SalesForce® platform, the data set field name may be "SalesForce_pass." In such an embodiment, code instructions generated based on visual element 504 may cause encryption of the data set field name "SalesForce_pass." Similarly, code instructions generated based on visual element 506 may cause encryption of the data set field value "MyP@$$." For example, such an encryption may direct any recordation of such a password in an execution log as a masked value such as "******" or may hash the value to "MyP@$$" to become "533bbdcaa5bc6516fe2617c0077fdf3f73bef7f69fb93cc710 7a79b3fdd93223." In order for the security credentials retrieval system in an embodiment to perform such an encryption of the security credentials data set field name during execution of the password retrieval nested within the password protected data integration process, a version of the retrieved security credentials having the unencrypted data set field name (e.g., "SalesForce_pass") may be temporarily stored or cached in memory at the location at which the runtime engine for the password retrieval that is nested within the password protected data integration process is executed.

In the embodiment in which the password retrieval is nested within the password protected data integration process, the execution of the additional step of changing the data set field name or data set field value for the supplied single keychain password, authentication token, or machine-linked application role or secured credentials retrieved using that keychain password to appear as encrypted ciphertext in execution logs automatically generated upon each execution of the password protected data integration process is part of the password retrieval within the password protected data integration process. In such a case, a user may view such an execution log, but the keychain password and security credentials migrated during execution will appear as encrypted ciphertext.

At block 716, in an embodiment in which a single user has modeled an executed password retrieval nested within a password protected data integration process in a single flow chart, a single execution log may be generated, displaying ciphertext in the place of security credentials received from the security credential management system to protect the security credentials as well as the secured data. As described herein, execution of the password retrieval as part of the password protected data integration process results in automatic generation of execution logs that list each of the data sets migrated, including the security credentials or keychain passwords provided by the user. In the case where password or security credential retrieval is modeled within a single flow chart with the password protected data integration process, as described with respect to block 716, a single execution log may be generated to show all data sets migrated during execution of the password protected data integration process with nested password retrieval. Such execution logs may be generated automatically in embodiments in order to demonstrate compliance with customer instructions, government data privacy regulations, or for tracking errors made during the password protected data integration process execution. These execution logs may list each of the datasets migrated during execution of a given password protected data integration process. For example, in the password protected data integration process that involves nested security credential retrieval for transmission of a keychain password and receipt of a security credential at an enterprise user, an execution log showing the keychain password and the retrieved security credential may be automatically generated and protection of such data in these execution logs is conducted at block 716. Further, there is some chance that these logs may be viewed by entities outside the enterprise, such as by an enterprise user's customers or by a government entity, as may occur during government privacy audits, for example.

In a first example embodiment in which the password retrieval is modeled as nested within the password protected data integration process, the user in possession of the single keychain password, authentication token, or machine-linked application role may model an additional step of changing the data set field name or data set field value for the supplied single keychain password, authentication token, or machine-linked application role or secured credentials retrieved using that keychain password to appear as encrypted ciphertext in execution logs automatically generated upon each execution of the password protected data integration process that includes the nested password retrieval. In such a case, the keychain password and security credentials migrated during execution will appear as encrypted ciphertext.

In a second embodiment in which the password is modeled as nested within the password protected data integration process, the user in possession of the single keychain password, authentication token, or machine-linked application role may still model an additional step of changing the data set field name or data set field value for the supplied single keychain password, authentication token, or machine-linked application role or secured credentials retrieved using that keychain password to appear as encrypted ciphertext in execution logs automatically generated upon each execution of the password protected data integration process that includes the password retrieval integration process. In such a case, the enterprise user not in possession of the keychain password or related security credentials, or other third parties may not have access to or the ability to view such an execution log, providing an added layer of security for the keychain password and the security credentials.

More specifically, in an example embodiment described with reference to FIG. 5, the GUI may allow the user to require any reporting of the data set field name or value for the single keychain password, authentication token, or machine-linked application role or the retrieved one or more security credentials to be shown in encrypted format, such as in ciphertext. For example, in an embodiment in which the password retrieval integration within the password protected data integration process directs retrieval of a password "MyP@$$" that is required in order to access password protected data stored at the user's SalesForce® platform, the data set field name may be "SalesForce_pass." In such an embodiment, the user may direct the encryption of the data set field name "SalesForce_pass" and the data set field value "MyP@$$." For example, such an encryption may direct any recordation of such a password in an execution log as a masked value such as "******" or may hash the value to "MyP@$$" to become "533bbdcaa5bc6516fe2617c0077fdf3f73bef7f69fb93cc710 7a79b3fdd93223."

The execution log generated at block 716 in an embodiment in which the password retrieval has been executed as a nested part of the password protected data integration process may be inaccessible to any enterprise users or third-party IT administrators, other than users who modeled the password protected data integration process that included retrieval of the security credentials from the security credentials management system. For example, in an embodiment described with respect to FIG. 5, in which the password retrieval nested within the password protected data integration process are modeled as a single process, an execution log may be viewed by enterprise users and third parties not normally in possession of single keychain password, authentication token, or machine-linked application roles or related security credentials, but the single keychain password, authentication token, or machine-linked application role or retrieved security credentials may be listed within that execution log only in an encrypted ciphertext format. Any execution log generated pursuant to execution of the password retrieval integration process within the password protected data integration process may record the retrieved security credentials with these encrypted ciphertext values for either or both the data set field name and data set field value. This may ensure that the execution logs may not disclose the single keychain password, authentication token, or machine-linked application role or any retrieved security credentials to employees or third parties within the enterprise not meant to be in possession of such credentials. The method for executing code instructions for a password protected data integration process may then end.

The blocks of the flow diagrams 6-7 discussed above need not be performed in any given or specified order and may be executed as code instructions at one or a plurality of hardware processors during preparation and set up of visually modeled integration process code instructions or of deployed integration process code instructions as described herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a security credential retrieval system in a password protected data integration process comprising:
a hardware processor executing code instructions for a graphical user interface (GUI) of an integration application management platform to model, with visual integration elements, a flow diagram of the password protected data integration process for transmitting a keychain password to a remote security credential management system to retrieve one or more security credentials for one or more remote password protected data repositories, for supplying the one or more security credentials to the one or more remote password protected data repositories, and for migrating one or more password protected data sets from each of the one or more remote password protected data repositories to one or more remote destination data repositories;
the hardware processor to generate and execute connector code instructions for each of the visual integration elements modeling the password protected data integration process to access secure data from the one or more remote password protected data repositories using the remote security credential management system; and
the hardware processor to generate an execution log displaying each of the one or more security credentials having a security credential data set field name and a security credential data set field value retrieved or migrated during execution of the connector code instructions of the password protected data integration process, where the security credential data set field value for each of the one or more security credentials supplied to the one or more remote password protected data repositories is reported in encrypted ciphertext to protect the security credentials in the execution log.

2. The information handling system of claim 1 further comprising:
the hardware processor to execute code instructions for retrieval of the one or more security credentials from the remote security credential management system prior to each execution of code instructions for migration of the password protected data sets.

3. The information handling system of claim 1, wherein the one or more security credentials retrieved from the remote security credential management system are cached in encrypted format at a memory of the integration application management platform operating within a remote service provider server.

4. The information handling system of claim 1 further comprising:
the hardware processor to execute code instructions for retrieval of a first of the one or more security credentials for migrating a first of the one or more password protected data sets from a first of the one or more remote password protected data repositories and retrieval of a second of the one or more security credentials for migrating a second of the one or more password protected data sets from a second of the one or more remote password protected data repositories.

5. The information handling system of claim 1, wherein the security credential data set field name for each of the one or more security credentials supplied to the one or more remote password protected data repositories is displayed within the execution log as encrypted ciphertext.

6. The information handling system of claim 1, wherein the keychain password supplied to the remote security credential management system is displayed within the execution log as encrypted ciphertext.

7. The information handling system of claim 1, wherein a keychain password data set field name and a keychain password data set field value for the keychain password supplied to the remote security credential management system is displayed within the execution log as encrypted ciphertext.

8. A method of retrieving security credentials within an integration process for migrating password protected data sets to one or more remote destination data repositories comprising:
receiving, via a graphical user interface (GUI), a first flow diagram with a first plurality of visual integration elements to model a password retrieval integration process for transmitting a keychain password to a remote security credential management system to retrieve one or more security credentials for one or more remote password protected data repositories;
receiving, via the GUI, a second flow diagram with a second plurality of visual integration elements to model a password protected data integration process for supplying the one or more security credentials to the one or more remote password protected data repositories, and for migrating the password protected data sets from each of the one or more remote password protected data repositories to one or more remote destination data repositories;
generating and executing, via a hardware processor, connector code instructions from the first plurality of visual integration elements with the remote security credential management system to access the one or more remote password protected data repositories and to retrieve secure data for the password protected data integration process; and
generating, via the hardware processor, a first execution log from the execution of the password retrieval integration process displaying the keychain password transmitted during execution of the connector code sets for the password retrieval integration process in encrypted ciphertext to protect the keychain password in the first execution log.

9. The method of claim 8 further comprising:
routinely executing, via the hardware processor, connector code instructions for the password retrieval integration process prior to execution of connector code instructions for the password protected data integration process to ensure retrieval and use of a most recently updated version of one or more security credentials within execution of the password protected data integration process.

10. The method of claim 8, wherein the one or more security credentials retrieved from the remote security credential management system are temporarily cached in encrypted format at a memory of the integration application management platform operating within a remote service provider server.

11. The method of claim 8 wherein the keychain password data set field name and the keychain password data set field value is reported in encrypted ciphertext in the first execution log to protect the keychain password.

12. The method of claim 8, wherein storage of the one or more security credentials retrieved from the remote security credential management system pursuant to execution of the password retrieval integration process is limited to storage in encrypted format at a memory of the enterprise system to protect the one or more security credentials.

13. The method of claim 8, wherein storage of the one or more security credentials retrieved from the remote security credential management system pursuant to execution of the password protected data integration process is limited to storage in encrypted format at a memory of the enterprise system to protect the one or more security credentials.

14. The method of claim 8 further comprising:
executing, via the hardware processor, the connector code instructions for the password retrieval integration process generated from the first plurality of visual integration elements to retrieve a first of the one or more security credentials for migrating, during execution of the password protected data integration process, a first of the one or more password protected data sets from a first of the one or more remote password protected data repositories and to retrieve a second of the one or more security credentials for migrating a second of the one or more password protected data sets from a second of the one or more remote password protected data repositories.

15. An information handling system operating a security credential retrieval system comprising:
a hardware processor executing code instructions for a graphical user interface (GUI) of an integration application management platform to model, with visual integration elements, a flow diagram for a password protected data integration process for transmitting a keychain password to a remote security credential management system to retrieve one or more security credentials for one or more remote password protected data repositories, for supplying the one or more security credentials to the one or more remote password protected data repositories, and for migrating one or more password protected data sets from each of the one or more remote password protected data repositories to one or more remote destination data repositories;

the hardware processor to generate connector code instructions for each of the visual integration elements modeling the password protected data integration process, where the connector code instructions for the password protected data integration process includes instructions to access the remote security credential management system for retrieval of the one or more security credentials to access the one or more remote password protected data repositories to migrate secure data;

the hardware processor to include execution log code instructions in the connector code instructions for the password protected data integration process to generate an execution log displaying a security credential data set field value for each of the one or more security credentials retrieved or migrated during a future remote execution of the connector code instructions in encrypted ciphertext; and a network interface device transmitting the connector code instructions, the execution log code instructions, and a runtime engine for remote execution of the password protected data integration process to an enterprise system.

16. The information handling system of claim 15, wherein storage of the one or more security credentials retrieved from the remote security credential management system pursuant to execution of the password protected data integration process is limited to storage in encrypted format at a memory of the enterprise system, to protect the one or more security credentials.

17. The information handling system of claim 15, wherein the connector code instructions instruct retrieval of a first of the one or more security credentials for migrating a first of the one or more password protected data sets from a first of the one or more remote password protected data repositories and retrieval of a second of the one or more security credentials for migrating a second of the one or more password protected data sets from a second of the one or more remote password protected data repositories.

18. The information handling system of claim 15 further comprising:
the hardware processor to generate the execution log code instructions for generating the execution log, where the security credential data set field name for each of the one or more security credentials supplied to the one or more remote password protected data repositories is reported in encrypted ciphertext.

19. The information handling system of claim 15 further comprising:
the hardware processor to generate the execution log code instructions for generating the execution log, where the keychain password supplied to the security credential management system is reported in encrypted ciphertext.

20. The information handling system of claim 19 further comprising:
the hardware processor to generate the execution log code instructions for generating the execution log, where a keychain password data set field name for the keychain password supplied to the security credential management system is reported in encrypted ciphertext.

* * * * *